US005645488A

United States Patent [19]
Collins

[11] Patent Number: 5,645,488
[45] Date of Patent: Jul. 8, 1997

[54] BACKGROUND SCREEN FOR A STAGE

[75] Inventor: Michael Alan Collins, Reno, Nev.

[73] Assignee: Collins Entertainment Systems, Inc., Reno, Nev.

[21] Appl. No.: 268,151

[22] Filed: Jun. 28, 1994

Related U.S. Application Data

[63] Continuation-in-part of Ser. No. 912,861, Jul. 13, 1992, abandoned, and a continuation-in-part of Ser. No. 93,601, Jul. 19, 1993, abandoned.

[51] Int. Cl.⁶ ............................................. A63J 1/02
[52] U.S. Cl. ......................................... 472/77; 472/80
[58] Field of Search ........................... 472/75, 77, 78, 472/79, 80

[56] References Cited

U.S. PATENT DOCUMENTS

| | | | |
|---|---|---|---|
| 1,619,719 | 3/1927 | Goldman et al. | 472/75 |
| 2,096,884 | 10/1937 | Dietlein | 472/75 |
| 2,294,930 | 9/1942 | Palmquist | 88/82 |
| 2,315,721 | 4/1943 | Martin | 18/34 |
| 2,379,741 | 7/1945 | Palmquist | 88/82 |
| 2,854,337 | 9/1958 | Pearson | 96/38 |
| 3,053,144 | 9/1962 | Harries et al. | 88/24 |
| 3,365,524 | 1/1968 | Thompson et al. | 264/40 |
| 3,558,102 | 1/1971 | Cruse | 254/93 |
| 3,637,285 | 1/1972 | Stewart | 350/105 |
| 3,692,621 | 9/1972 | Frech | 161/116 |
| 4,380,368 | 4/1983 | Ohmata et al. | 350/117 |
| 4,380,369 | 4/1983 | Schacht | 350/307 |
| 4,406,519 | 9/1983 | Shaw | 350/117 |
| 4,478,902 | 10/1984 | Tsuzuku et al. | 428/174 |
| 4,652,084 | 3/1987 | Daszinnies | 350/117 |
| 4,662,628 | 5/1987 | Chatenay epouse Compagnone | 272/22 |
| 4,749,347 | 6/1988 | Valavaara | 425/135 |
| 5,170,287 | 12/1992 | Ludwig, Jr. et al. | 359/452 |

FOREIGN PATENT DOCUMENTS

| | | |
|---|---|---|
| 2400848 | 7/1975 | Germany. |
| 1248627A1 | 8/1986 | U.S.S.R. . |

*Primary Examiner*—Kien T. Nguyen
*Attorney, Agent, or Firm*—Skjerven, Morrill, MacPherson, Franklin & Friel; Alan H. MacPherson; Omkar K. Suryadevara

[57] ABSTRACT

A background screen in accordance with this invention creates an illusion of a predetermined background at the rear of an entertainment stage by using three-dimensional background elements and projected images. In one embodiment, a background element includes projectionable material suitable to receive a detailed image and image replacement material to correct any loss of image detail. In another embodiment, image replacement material covers the entire background element. A two-dimensional display screen is also mounted on a frame of the background screen to display additional elements and details not in the background elements. The background screen is positioned on a stage in a theater, between a proscenium and a projector. The projector projects images on the background screen which add details to a background element and/or details and elements to the display screen such that when the front side of the background screen is viewed by a person in one of the seats of the audience area, a realistic three dimensional illusion of the predetermined background is formed in the person's mind. A process to fabricate the background screen is also described.

19 Claims, 21 Drawing Sheets

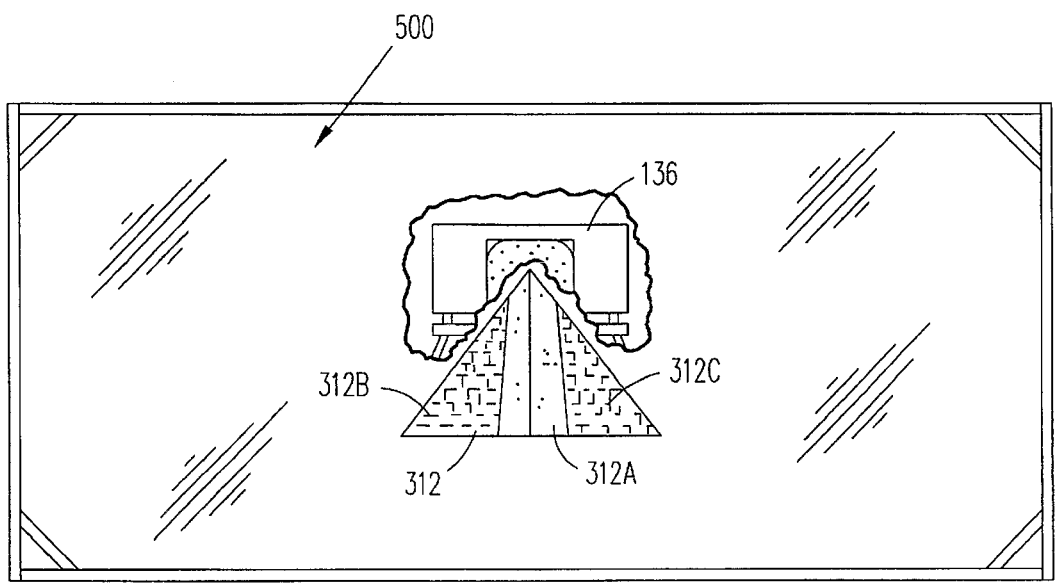
FIG. 5B
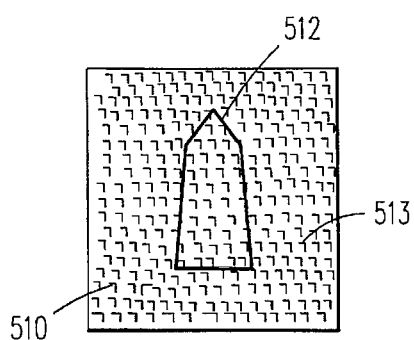
FIG. 5C
FIG. 5D
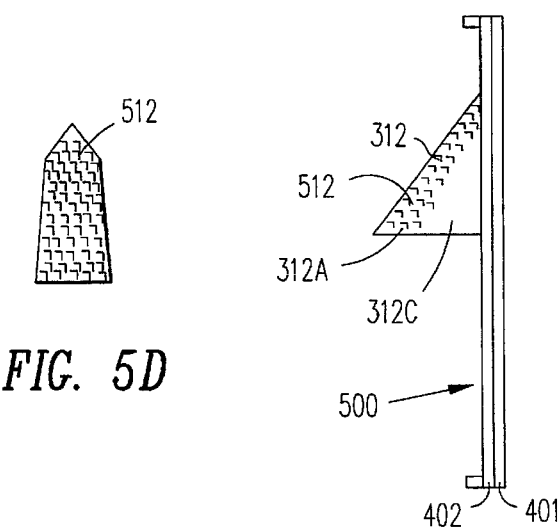
FIG. 5E

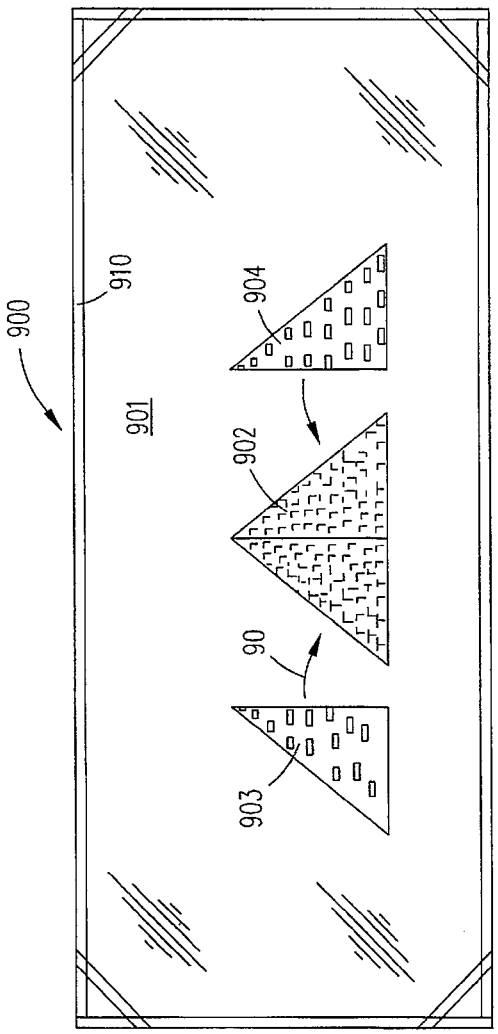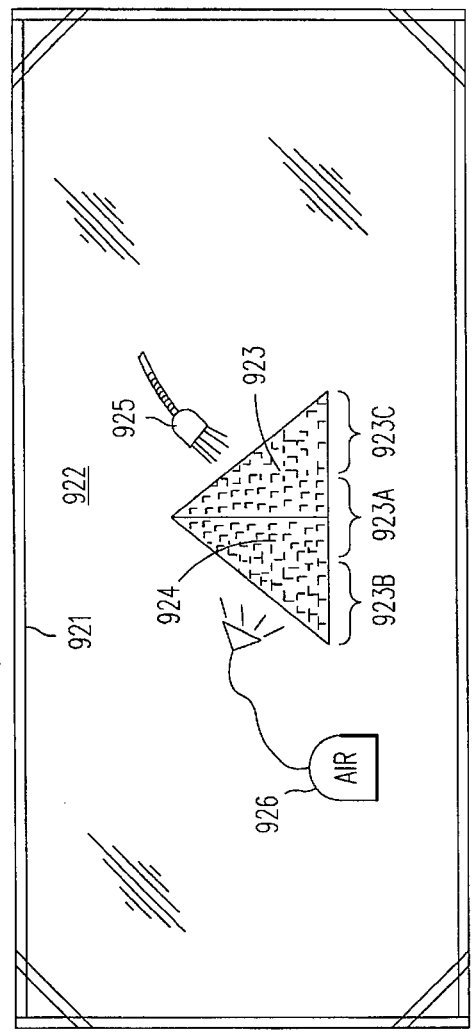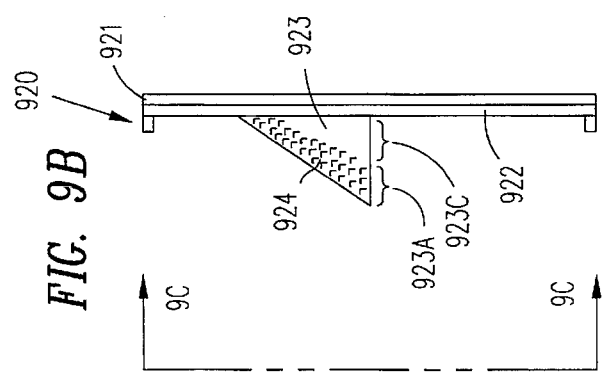

BACKGROUND SCREEN FOR A STAGE

CROSS REFERENCE TO RELATED APPLICATIONS

This is continuation-in-part of application Ser. No. 07/912,861 filed Jul. 13, 1992, now abandoned and application Ser. No. 08/093,601 filed Jul. 19, 1993, now abandoned.

FIELD OF THE INVENTION

This invention generally relates to background screens used at the rear of a stage and in particular to background screens having three dimensional background elements which portray a background illusion when images are projected from a projector onto the background screen.

BACKGROUND OF THE INVENTION

In the past, stage design used natural products from the earth such as animal products, stone, wood, and plant fibers. Recent stage designs used paper, plastic, clays, paints, and forged metal for forming foreground and background stage objects. As twentieth century technology dawned, stage designers replaced elaborate candle and gas lighting fixtures with incandescent lamps and later, with high-powered spot lights. Today, leading stage designers are sophisticated in the engineering mechanics of acoustics, computers, electrical systems, film, hydraulics, lighting, motion control, motors, sound amplification, and video.

Numerous individual stage design inventions have resulted from integration and enhancement of other inventions. Thus, modern stage designs have been the work of designers combining different ideas, inventions, and products of their own and others to create a cohesive stage design unique to each individual production.

The costs of staging a show with elaborate background scenery are tremendous irrespective of whether the show is live theater, a musical performance, ballet, the opera, or even a professional ice show. Almost all shows are designed either as one venue productions or are staged in big cities where long runs in large theaters and arenas are assured. This business side of artistic production which has evolved naturally is governed by the laws of economics.

Moreover, today's typical background scenery for a stage is cumbersome and fragile. Current background sceneries are created manually by applying paint to paper, wood, plastic, and steel. These design techniques and the resulting background sceneries are perfectly suitable for single venue stage presentations which, by design, stay at one venue for the length of the intended performance run.

On rare occasions, when background sceneries are designed for more than one venue, the background sceneries are merely made portable. Background sceneries designed for one or even two venues, are not suitable for extended tours as the background sceneries are subjected to great stress and commonly break down during transportation. Therefore, use of such background sceneries for touring performances is not economical over the long haul.

If a show does travel over a long period of time, background sceneries deteriorate and must be continuously re-furbished at great expense. As noted above, background sceneries are particularly expensive to design and fabricate, so that continual refurbishment costs can severely affect the profitability and long-term viability of a theater company.

The above described natural evolution of shows doesn't adequately recognize the people of the smaller cities and metropolitan areas throughout the world who do not have the financial ability to travel to the performance capitals to see artistic performance at its highest level. When top shows direct from the Broadway stage do travel, they rarely go into a metropolitan area of less than several million. Therefore, there is an artistic dearth in the hinterlands.

Another negative result of the current economics and technology of the performance touring industry, is that current background sceneries are designed for theaters with a large "fly area". The fly area of a theater is the open area above and behind the proscenium arch of the stage where background sceneries are stored and then moved (or "flown") down to the stage during performance. Many older theaters, such as Carnegie Hall and newer arenas do not have fly areas. Thus, venues without fly areas are unable to stage shows with elaborate background sceneries, rendering such venues unable to compete for many popular top-grossing shows.

When touring concert performers seek to accentuate their performance, they often achieve it by designing background sceneries to match the theme of their current production. Concert background sceneries are often constructed of painted wood, steel, molded plastic, vertical hydraulic lifts, lighting and control electronics to allow a show to be seen by the ticket buyer sitting at the far upper reaches of a 20,000 seat arena or a 50,000 seat stadium. Admittedly, touring musical concert performers do a better job reaching small cities than do theatrical stage shows. But, because of the cost of moving the sets, large concert tours, (which do reach many differently sized cities), often become more of a promotional effort to help sell the musical recordings of the touring concert performers, rather than a venture designed for profit.

Today's concert and theatrical stage designers have been successful at adapting current lighting and sound technology to achieve a desired background illusion. But, because their focus has been on individual shows, rather than producing complete systems which benefit the industry as a whole in quality and price over time, the industry has suffered. This becomes clearly apparent in times of economic downturn when the consuming public has less disposable income for luxuries such as concerts, plays, and shows. A modern producer of a show is always faced with the task of competing aesthetically with the last "big" show. He/she must deal with rising production value costs while squarely facing the possibility of a half-sold show in a large arena, because of a bad economy. This fact has forced the modern producer to consider the advantages of bringing more high entertainment technology into the live performance to remain competitive.

Within the last five years, it has become apparent that the art of live performance has truly begun blending with the improving technology of video and film production. Audiences at large musical performances now expect to see video projections of the artist displayed on flat screens on and adjacent to the stage. Nowadays, its the rare performer who doesn't produce several music videos to complement their latest music recording release.

As the quality of video projection equipment increases, so does the frequency of its usage by theatrical producers and concert producers. Current video projection equipment can transmit a clear image on an extremely large screen so that a person at the back of the arena or stadium can see clearly the projected image.

Projection screens have all had two-dimensional shapes and sizes over the years. A projection screen is positioned so that film, video, or slide images can be projected from the front or behind so as to accurately portray an intended image. Such projection screens are well-known and have been described, for example in U.S. Pat. Nos. 2,379,741 and 2,294,930 and 3,637,285 and 4,478,902.

In the performance arts today, numerous producers and companies experiment with and profit from film and video projections. But, their efforts still remain rooted in the concept of creating a projection system for an individual show, utilizing commercially available equipment and scaling them as necessary.

To this point, the usage of projection in performance art has been limited to stationary film and video projectors projecting images on flat rectangular screens. For instance, performance artist George Coates of San Francisco has experimented with video projections on flat objects or screens designed for single venue usage for several years. With special effects, the projected images do give a greater sense of depth. However, this technique does not create an aesthetically pleasing three-dimensional image because the audience must wear polarized glasses and the screen lacks varying levels of depth to its surface. Coates has also experimented with two parallel flat diaphanous screens, which fail to provide a three dimensional effect. Coate's productions are designed for one theater only, with no system portability built into its design.

Hence, conventional two dimensional projection screens fail to provide the necessary depth whereas three dimensional projection screens fail to provide the necessary detail due to loss of image clarity (unless polarized glasses are used).

A long-held goal of stage designers has been to create stage backgrounds which portray the reality of life in depth, size, detail and texture. The approach of the current theatrical producer who utilizes video projection is short-sighted and is reminiscent of an old style of thinking of creating costly individual systems for individual shows in large metropolitan area, which limits its benefits to a smaller, more privileged group.

SUMMARY OF THE INVENTION

A background screen in accordance with this invention creates a three dimensional illusion of a predetermined background at the rear of a stage using background elements and projected images. Each background element has a three dimensional shape which represents an element in a predetermined background, such as a pyramid in a desert. A background element can include projectionable material suitable to receive details of a projected image and image replacement material to repair any loss of detail in the projected image. Loss of detail can occur in some areas of a projected image due to focus imbalance or convergence imbalance in those areas caused by a two dimensional image being projected on a three dimensional shape of a background element. The image replacement material is applied to areas of image loss to replicate the lost details and/or to mask the lost details by adding a new feature (such as a shadow) to the background element.

In one embodiment, the image replacement material includes paint which can be either opaque or transparent. An artist applies the paint to skillfully blend the areas of image loss into the rest of the projected image. In another embodiment, the image replacement material includes a film product, (for example DURACLEAR™ and DURATRANS™) which has a detailed image replicating the projected image thereby repairing the detail in image loss areas.

In another embodiment, image replacement material is applied to the entire three dimensional background element, completely replacing the details of the projected image. Complete replacement of a projected image on a background element by image replacement material allows an artist to portray realistic texture and depth of a background element which are not adequately portrayed by a projected image. In such an embodiment, an image can be projected on other areas of the background screen such as other background elements and/or display screens. The other background elements can include projectionable material and/or image replacement material as described above. Moreover, a background screen can include a two dimensional display screen for displaying various details and elements of the projected image which are not in the background elements.

In one embodiment of this invention, a rigid display screen is mounted on a frame and background elements are mounted on the display screen. In another embodiment of this invention, a flexible display screen is used and a background element is suspended from a frame using a wire.

In one embodiment of this invention, the background screen is located on a stage between a proscenium and a projector. The proscenium includes a left proscenium wall and a right proscenium wall. In one embodiment, a curtain mechanism with a curtain is interposed between the left proscenium wall and the right proscenium wall. The background screen is located behind the curtain mechanism and is visible between the left proscenium wall and the right proscenium wall to a viewer in a seat in the audience area (when the curtain is open). The projector projects images on the background screen such that a realistic three dimensional illusion is formed in the viewer's mind.

The illusion formed by the background screen is startlingly real and life-like because one or more three dimensional background elements provide depth without loss of detail and smoothly guide the viewer's eyes into one or more two dimensional display screens which display additional details and elements formed by the projected image.

The separation of a stage background into (1) a background screen with three dimensional background elements and (2) image details of projected images independent of each other provides considerable flexibility. The storage of images on video, film and/or slide ensures that image detail can be economically and safely stored and transported without any degradation whatsoever. Also, the background screen with three dimensional background elements can be easily dismantled, stowed, transported and installed. Also, minor degradation of the background elements does not affect quality of the illusion because the details for the illusion are provided by projected images. Any noticeable degradation can be repaired by applying additional replacement material or even avoided in some cases by applying replacement material on a concave side of a background element. Hence a producer can economically travel to a distant venue for a short period of time, sell out the show, and then move quickly on to another venue. Also, the background screen reduces scenery development and production costs by allowing use of video, film or computer graphics technology for creating background scenery. Therefore, a theater or concert ticket becomes more available and affordable to the average consumer living in the hinterlands.

A background screen can be fabricated using three technologies: (1) mold making, (2) projection screen manufacturing and (3) stage craft fabrication. A three-dimensional mold is used to form a background element of desired three dimensional shape and size. Once a background element is formed, the background element is coated with projectionable material commonly used in projection screen manufacturing. One or more background elements are then supported on a frame to form the background screen. Then film, slide or video images are projected onto the background screen. All areas having loss of image clarity are noted and artists apply image replacement materials to the image loss areas to supplement the projected image details. Once image replacement materials are applied, the background screen effectively portrays to an audience a realistic background illusion. Such a combination of three dimensional background elements, projected images and image replacement materials into a background screen can be used to form any background illusion needed on a stage for any form of entertainment.

Therefore integration of video, slide and/or film projection technologies with mold making and stage craft fabrication creates an inexpensive, portable and durable background screen for an entertainment stage.

BRIEF DESCRIPTION OF THE DRAWINGS

FIGS. 5A and 5B illustrate the image loss areas in a background element when an image is projected on the background screen of FIG. 4F.

FIGS. 5C, 5D and 5E illustrate the application of image replacement material on a background screen in accordance with this invention.

FIG. 9A illustrates an alternative embodiment of a background screen with repair material located on all portions of the background element.

FIGS. 9B and 9C illustrate the use of paint as image replacement material for a background screen in accordance with this invention.

DETAILED DESCRIPTION

Figure 1A:
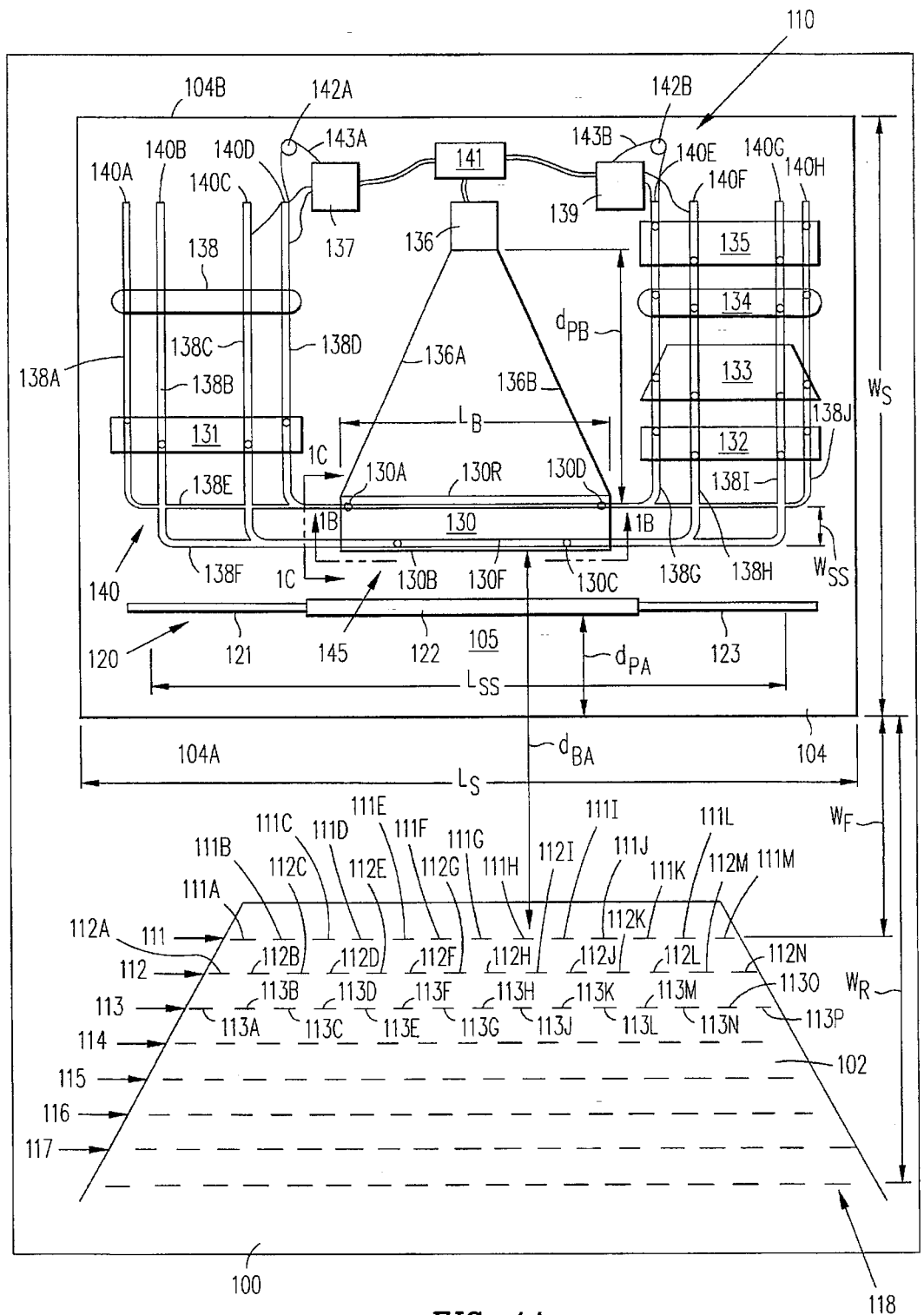
FIG. 1A illustrates a theater including a background screen in accordance with this invention.

FIG. 1A illustrates one embodiment of a theater 100 including a background screen 130 in accordance with this invention. Theater 100 can be any theater such as Carnegie Hall of New York, N.Y. Theater 100 includes an audience area 102 and a stage 104. Audience area 102 includes several rows for seating an audience such as rows 111, 112, 113, 114, 115, 116, 117 and 118. Each of the rows includes several seats such as seats 111A, 111B, 111C, 111D, 111E, 111F, 111G, 111H, 111I, 111J, 111K, 111L and 111M in row 111, and seats 112A–112N in row 112 and seats 113A–113H and 111J–113P in row 113. The front row, row 111 is at a distance $W_F$=20 feet from front side 104A of stage 104. Back row 118 is at a distance $W_R$=60 feet from the front side 104A of stage 104.

Stage 104 has a width $W_S$=50 feet, a length $L_S$=60 feet and is elevated from the floor by a height $H_S$=6 feet (not shown). On stage 104 is a stage design system 110 which is an automated and portable system for studio, entertainment, theatrical and other purposes. Stage design system 110 includes background screens 130, 131, 132, 133, 134 and 135.

Each of background screens 130, 131, 132, 133, 134 and 135 is custom designed with numerous three dimensional background elements of various sizes, shapes and contours matching the outlines of elements in predetermined background illusions to be formed on stage 104. Each of background screens 130, 131, 132, 133, 134 and 135 can be a pliant, diaphanous, multi-dimensional stage screen capable of displaying images as described in co-pending U.S. patent application Ser. No. 08/093,601, which is incorporated herein in its entirety.

Each of background screens 130, 131, 132, 133, 134 and 135 is conveyed through a stage screen conveyance mechanism 140. Stage screen conveyance mechanism 140 can be any mechanism which conveys and presents a background screen to an audience in center stage position 145 adjacent left proscenium wall 121 and right proscenium wall 123 (which form proscenium 120). A proscenium wall in accordance with this invention is any object which shields various parts of stage design system 110 from the audience. For example, trees or rocks can be used as proscenium walls in alternative embodiments. In the embodiment of FIG. 1A, the left and right proscenium walls 121 and 123 are made of traditional stage craft materials such as sheetrock. In one embodiment, each proscenium wall is two sheets of 4×8 feet sheetrock placed side by side, which have the advantages of being sufficiently light weight and portable. A curtain mechanism 122 is interposed between left proscenium wall 121 and right proscenium wall 123 in the embodiment of FIG. 1A. Curtain mechanism 122 raises and lowers a curtain (not shown) between acts on stage 104 for example, to move a new background screen into center stage position 145. In an alternative embodiment, there is no curtain mechanism between left proscenium wall 121 and right proscenium wall 123 and a background screen is moved in darkness. Background screen 130 is at a distance $d_{BA}$=20 feet from the first row 111 in the audience area. On stage 104, there is a performance area 105 having a width $d_{PA}$=10 feet between stage front side 104A and left and right proscenium walls 121 and 123.

Stage design system 110 also includes a projector 136 which projects images on background screen 130 from strategic angles, which are angles not seen by an audience. In the embodiment of FIG. 1A, projector 136 is located behind background screen 130 at a distance $d_{PB}$=20 feet from background screen 130. However, in alternative embodiments, projector 136 is located at the sides and in front of background screen 130. In one embodiment, projector 136 is a slide projector such as Model EKTACH-ROME available from KODAK of Rochester, N.Y. In alternative embodiments, projector 136 is a film projector and a video projector.

Each of background screens 130, 131, 132, 133, 134 and 135 can be flown (lowered) to its center stage position 145 by conventional stage screen conveyance mechanisms resident in a fly area of a stage. Alternatively, a background screen can be positioned by a stage screen conveyance mechanism as described in copending U.S. patent application Ser. No. 07/912,861, which is incorporated herein in its entirety. A background screen can also be positioned by stage hands manually moving a background screen into its proper position. Proper positioning of the background screen is necessary to ensure that an image projected by projector 136 is properly focused and aligned on the background screen.

Figure 1B:
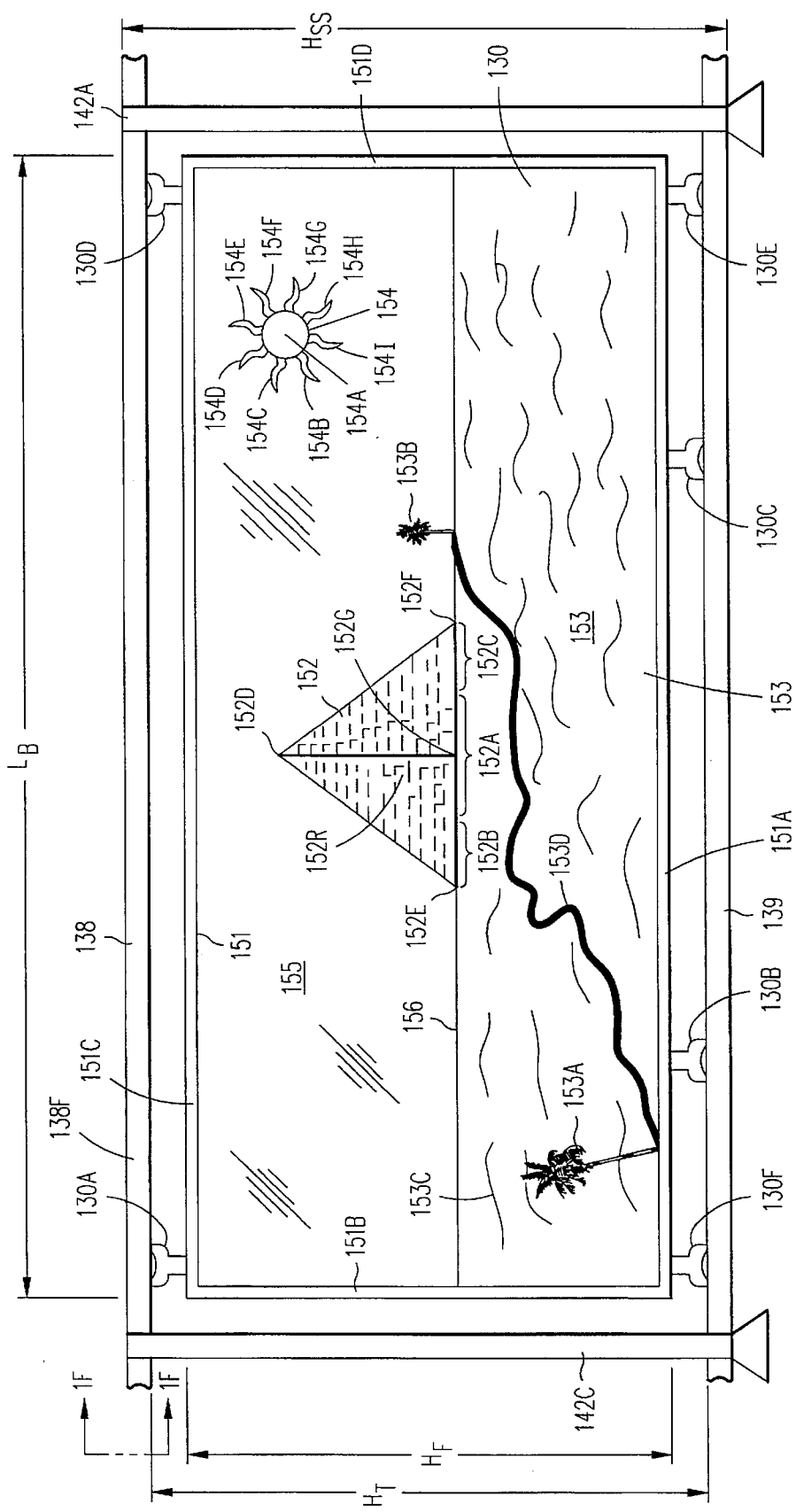
FIG. 1B is a sectional view taken along the direction 1B—1B of FIG. 1A illustrating an elevation view of a background screen in accordance with this invention.
Figure 1C:
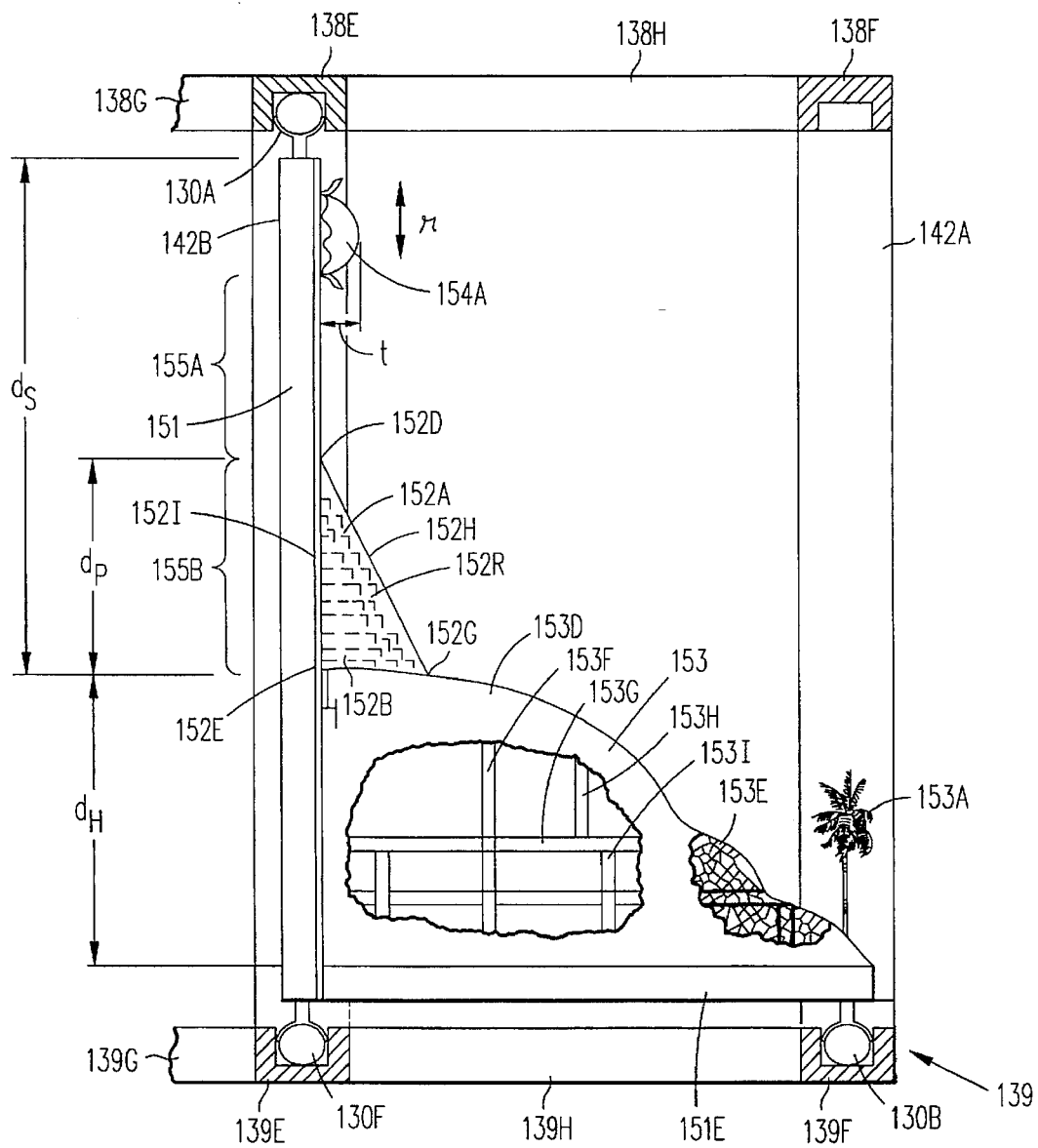
FIG. 1C illustrates a sectional view taken along the direction 1C—1C of FIG. 1A illustrating a side view of a background screen in accordance with this invention.
Figure 1D:
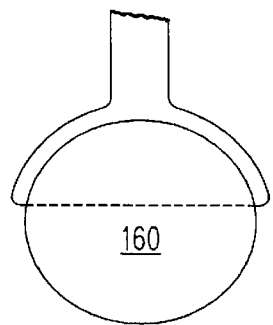
FIG. 1D illustrates one of a number of screen conveyance enabling devices attached to a background screen to allow a background screen to be rapidly and accurately moved on a stage.
Figure 1E:
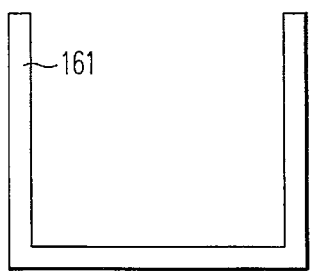
FIG. 1E illustrates an end view of a track in which the screen conveyance enabling device of FIG. 1D moves.

Stage screen conveyance mechanism 140 shown in FIGS. 1A, 1B and 1C is a two-level tracked mechanism which includes an upper conveyance mechanism housing 138 and a floor-mounted conveyance mechanism housing 139. Upper conveyance mechanism housing 138 includes tracks 138A, 138B, 138C, 138D, 138E, 138F, 138G, 138H, 138I and 138J (FIG. 1A). Similarly, floor-mounted conveyance mechanism 139 includes tracks 139E, 139F, 139G, and 139H (FIG. 1C) as well as other tracks which are not shown in FIGS. 1A, 1B and 1C but are parallel to tracks 138A, 138B, 138C, 138D and 138I and 138J. In one embodiment, this invention, tracks, such as tracks 138A, 138B, 138C and 138D, are channels, such as channel 161 shown in FIG. 1E in which the cupped bearings (such as cupped bearing 160 of FIG. 1D) of background screens 130, 131, 132, 133, 134 and 135 travel in stage screen conveyance mechanism 140.

Figure 1F:
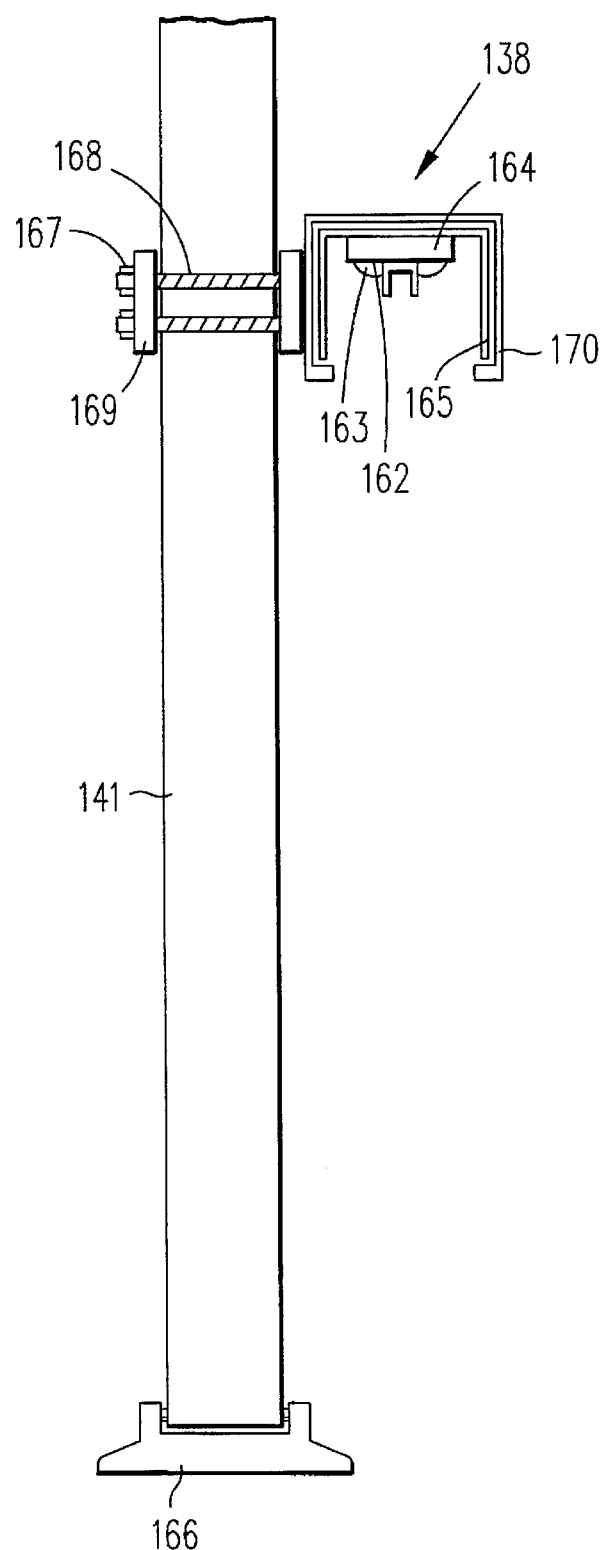
FIG. 1F illustrates an end view in the direction 1F—1F of FIG. 1B illustrating an upper conveyance mechanism including the track of FIG. 1E mounted on a support strut.

FIG. 1F illustrates an end view of one embodiment of upper conveyance mechanism housing 138. Floor-mounted conveyance mechanism housing 139 is similar to upper conveyance mechanism housing 138 of FIG. 1F. Tracks for upper and floor-mounted conveyance mechanism housing 138 and 139 are extruded anodized aluminum tracks such as track 162 (FIG. IF) (for example AT 123000–203000 available from Ambassador Industries, 2754 West Temple Street, Los Angeles, Calif. 90026). As shown in FIG. 1F, extruded anodized aluminum track 162 is mounted by track stirrups 163 (for example AP110000 from Ambassador Industries) on wood strips 164 (for example 1 inch×4 inch by 6 feet fir wood strips) fastened by 2 inch sheetrock screws (not shown) to join a rain gutter 165 (for example three 10 feet lengths of PVC rain gutter).

Floor-mounted conveyance mechanism housing 139 is rigidly mounted to the floor of stage 104. Upper conveyance mechanism housing 138 is supported by floor-mounted upright support struts 141 and 142 (FIG. 1B). Upper conveyance mechanism 138 is at a distance $H_T$=9 feet from floor mounted conveyance mechanism housing 139.

Attached to background screen 130 are screen conveyance enabling devices 130A, 130B, 130C, 130D, 130E and 130F. Screen conveyance enabling devices 130A, 130B, 130C, 130D, 130E and 130F are moved by upper tracks 138A, 138D, 138E, 138G and 138J and lower tracks 139E, 139F, 139G and 139H and other tracks (not shown). In the embodiment of FIGS. 1A, 1B and 1C, screen conveyance enabling devices 130A, 130B, 130C, 130D, 130E and 130F are cupped bearings (such as cupped bearing 160 shown in FIG. 1D). In an alternative embodiment, screen conveyance enabling devices 130A, 130B, 130C, 130D, 130E and 130F are Roller Carrier Body, with Pendant and Hook APO1000 available from Ambassador Industries, 2754 W. Temple Street, Los Angeles, Calif. 90026. Roller carrier bodies fit neatly within the extruded anodized aluminum track (described above) and allow ease of movement of a background screen along the tracks.

In one specific embodiment of this invention, stage screen conveyance mechanism 140 has length $L_{SS}$ (FIG. 1A) of 30 feet, width $W_{SS}$ of 6 feet and height $H_{SS}$ of 10 feet. Stage screen conveyance mechanism 140 is mounted on two parallel strips of 2 inch×4 inch×96 inch fir wood studs fastened to the cement floor with ¼ inch×4 inch concrete screws. Mounted on the fir wood studs are four 1½ inch floor flanges (such as flange 166 of FIG. 1F) by ¼ inch×2 inch wood screws which have four 1½ inch 10 feet aluminum pipes (such as strut 141) screwed into the flanges. Thus the support struts of aluminum pipes are upright and quite sturdy. Fastened by ¼ inch×4 inch bolts and nuts (such as bolt 168 and nut 167) to the aluminum pipe (such as strut 141) are 1½ inch muffler clamps. The one and half-inch muffler clamps (such as muffler clamp 169) are available from any auto store such as Grand Auto Brand, 1120 South Virginia Street, Reno, Nev. 89502. The muffler clamps are fastened 6 inches from the floor and 9 feet from the floor. Muffler clamps (such as clamp 169) provide a stable mount for the 5 inch PVC rain gutter clamps (such as gutter clamp 170). One PVC rain gutter clamp each is mounted at the bottom and top of each pipe, with the U-shaped clamp portion facing each other, to provide a convenient channel for mounting the 5 inch×10 feet PVC rain gutter for the upper and lower conveyance mechanism housings 138 and 139. The PVC rain gutter is 5 inch×10 feet rain gutter available from any hardware store such as Home Depot brand, 2401 South Virginia Street, Reno, Nev. 89570. A background screen, such as background screen 130 enters stage screen conveyance mechanism 140 at stage screen entry points 140E, 140F, 140G and 140H (FIG. 1A). The movement of a background screen is activated and controlled by a computerized motion control system housed in control both 141.

Control booth 141 (FIG. 1A) contains a control computer and projection control electronics. The control computer is connected to conveyance motors 137 and 139. Conveyance motors 137 and 139 in turn drive conveyance gears 142A and 142B using chains 143A and 143B. Projection control electronics of control booth 141 controls image recorders and players and transfers an image to be projected to projector 136. The control computer in control booth 141 controls the movement of background screens 130, 131, 132, 133, 134 and 135 in stage screen conveyance mechanism 140 from stage screen entry points 140E, 140F, 140G and 140H through center stage position 145 to stage screen exit points 140A, 140B, 140C and 140D. Center stage position 145 is a position of a background screen which is immediately behind curtain mechanism 122 and in front of projector 136 (as shown by the position of background screen 130 in FIG. 1A). Center stage position 145 is at a precise distance of $d_{PB}$ from projector 136 such that when an image is projected by projector 136 the image aligns and focuses on the background elements and/or a display screen of a background screen 130. A background screen in center stage position is visible between left proscenium wall 121 and right proscenium wall 123 to a viewer seated in audience area 102.

FIG. 1B illustrates one embodiment of a background screen 130 in accordance with this invention. Background screen 130 includes a frame 151 which includes frame members 151A, 151B, 151C and 151D. Frame 151 has a length $L_F$=9 feet and a height $H_F$=8 feet. In another embodiment of this invention, a frame 151 is a square frame. Frame 151 is made of wood, plastic and metal frame members in alternative embodiments of this invention.

Background screen 130 includes a display screen 155 supported by frame 151. A display screen is any two dimensional, flat sheet with a coating of projectionable material suitable for the display of a projected image. In one embodiment, the flat sheet is an optically clear sheet of acrylic plastic such as ⅜ inch thick ACRI-LOC™ of Dupont Chemicals available from Tripp Plastics, Inc., 250 Gregg Street, Sparks, Nev. 89501. Acrylic, plastic or vinyl of any thickness which is transparent, strong and light can be used to form a display screen. A display screen can also be formed from glass, although glass is heavier and more fragile than plastic or acrylic. A display screen is rigid in one embodiment and flexible in an alternative embodiment. In the embodiment of FIG. 1B, display screen 155 includes a ⅜ inch flat sheet of length L=9 feet and width W=8 feet of clear LEXAN™ manufactured by Dupont Chemicals, available from Tripp Plastics, Inc. having a layer of projectionable material.

Figure 11A:
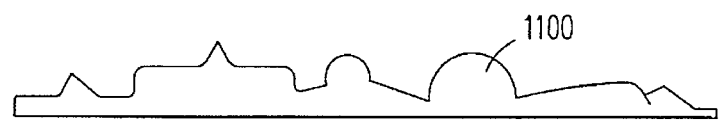
FIG. 11A illustrates a molded part for a three dimensional display screen in accordance with this invention.
Figure 11B:
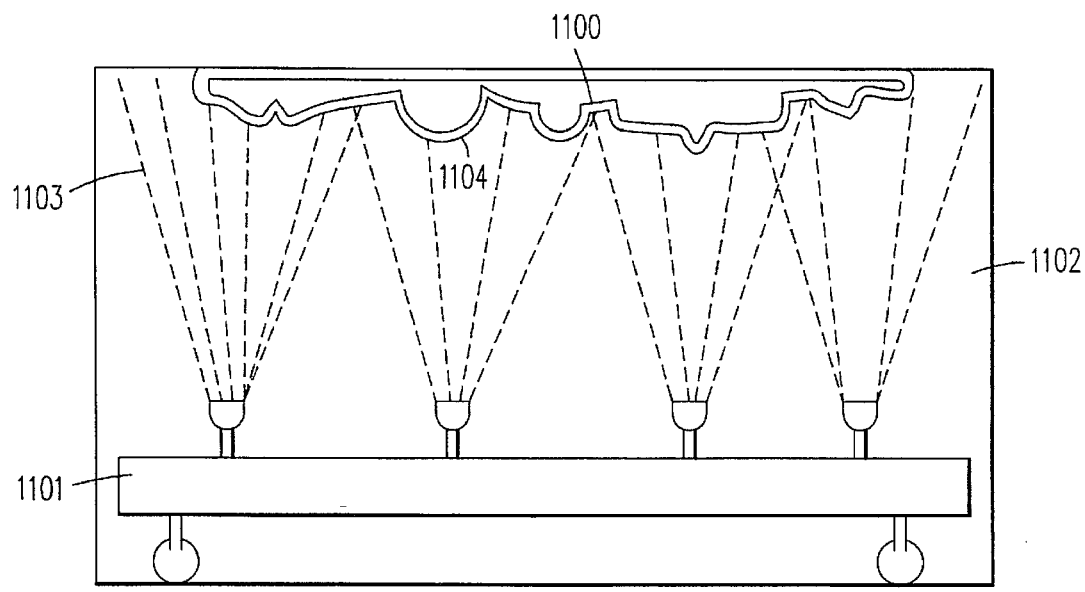
FIG. 11B illustrates the spraying of the molded part of FIG. 11A with a projectionable material.
Figure 11C:
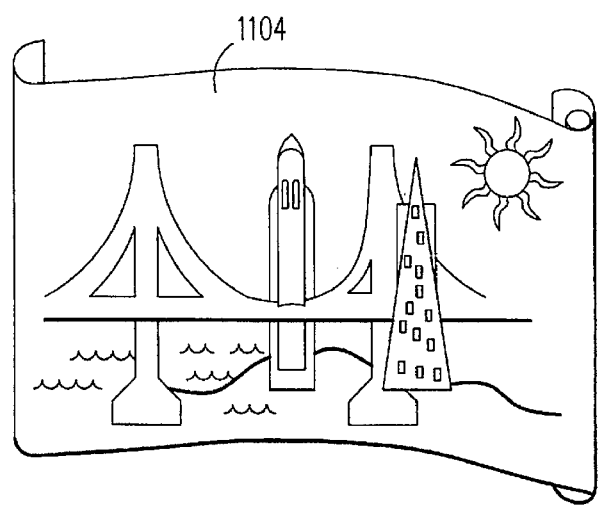
FIG. 11C illustrates a three dimensional background screen in accordance with this invention.

The projectionable material is any material which displays an image projected by a projector. In one embodiment, the projectionable material is Stewart Film Screen 180 available from Stewart Film Screen Corporation, 1161 W. Sepulveda Blvd., Torrence, Calif. 90502. Stewart Film Screen 180 is commercially sold as a thin flexible diaphanous sheet which can be applied to a flat sheet using an adhesive to form display screen 155. The adhesive can be any strong adhesive such as a cyanoacrylate adhesive (for example CYLOK®P available from Lord Chemical of Germany). Furthermore, Stewart Film Screen 180 can itself be used as a display screen after being cut to the proper dimensions (FIG. 8B). Alternatively, a liquid form of Stewart Film Screen 180 can be sprayed, or applied with a brush to a flat sheet to form display screen 155. Furthermore, a liquid form of Stewart Film Screen 180 can be sprayed on a molded part to form a three dimensional background element (FIGS. 3D, 3E, 3F, 3G and 3H) or a background screen (FIGS. 11A, 11B and 11C).

The projectionable material is located on display screen 155 only in areas directly visible from a seat in the audience area 102. Areas of a flat sheet covered by background elements are clean of projectionable material. For example, display screen 155 has projectionable material in area 155A and clear LEXAN™ surfaces in the area 155B covered by first background element 152 to permit the projected image to pass through display screen 155 and be incident (fall) on first background element 152 (FIG. 7C and 7E). Alternatively, an area 155B (FIG. 1C) of a display screen covered by a background element, can be cut to form a hole to allow passage of the projected image (FIG. 8B).

Display screen 155 is attached to frame members 151B, 151C and 151D (for example, as described below in reference to FIG. 4C). In the embodiment of FIGS. 1A, 1B, and 1C, display screen 155 is sufficiently rigid and strong to support the weight of first background element 152 and third background element 154 (described below).

Background screen 130 includes a first background element 152 which has a three-dimensional shape of a pyramid formed (as described below) from a ⅛ inch sheet of clear LEXAN™ available from Tripp Plastics, Inc. A background element can be formed of any acrylic, plastic or vinyl which can be shaped into a three dimensional shape representative of an element in a background and on which a projectionable material can be applied. First background element 152 has a front side 152H facing audience area 102 and a rear side 152I facing projector 136.

First background element 152 includes a layer of projectionable material (described above) which is applied to the convex front side 152H and alternatively to the concave rear side 152I of first background element 152 in two embodiments of this invention. Therefore, first background element 152 can display the details of surface texture of a pyramid of a projected image (which passes through display screen 155).

In one embodiment, first background element 152 is permanently mounted on display screen 155 using an adhesive such as an epoxy or the cyanoacrylate adhesive described above. In another embodiment, first background element 152 includes three pegs at corners 152D, 152E and 152F (FIG. 1C) which allow background element 152 to be removably mounted in corresponding holes of display screen 155 (as described below in reference to FIGS. 7A–7D). Alternatively, background element 152 can also be removably mounted on frame 151 using wires (FIGS. 6A–6D), which becomes necessary if the display screen is a thin, flexible sheet (FIG. 8B).

First background element 152 also includes image replacement material 152R in image loss area 152A to replicate the details of the surface texture of a pyramid element in the background illusion to be formed. Image loss area 152A is an area of first background element 152 where the loss of details of surface texture is visible from a seat in audience area 102 when an image containing the details is projected on first background element 152.

Figure 5A:
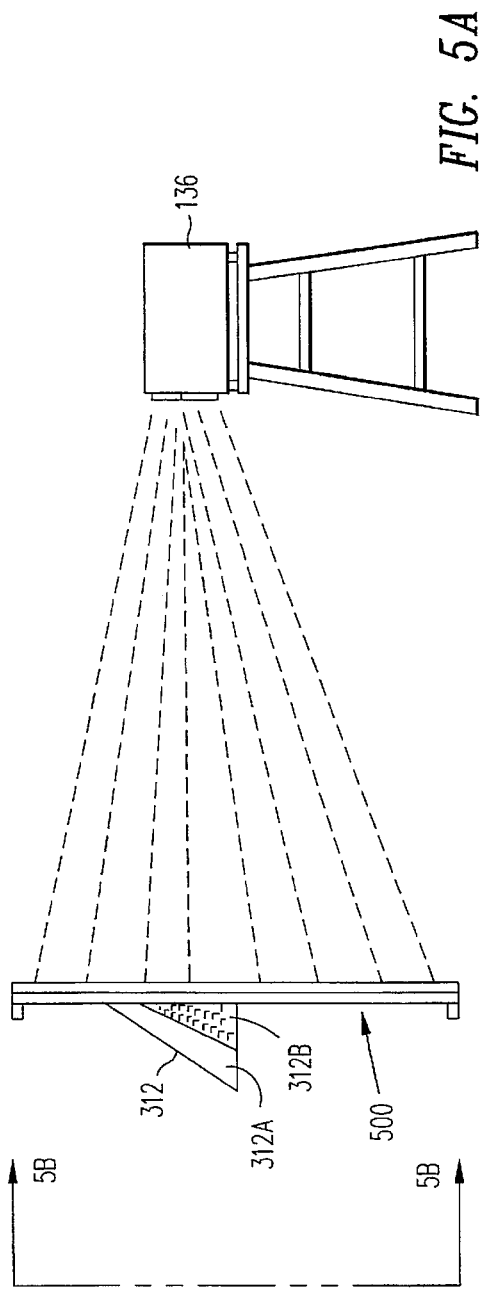
Figure 5F:
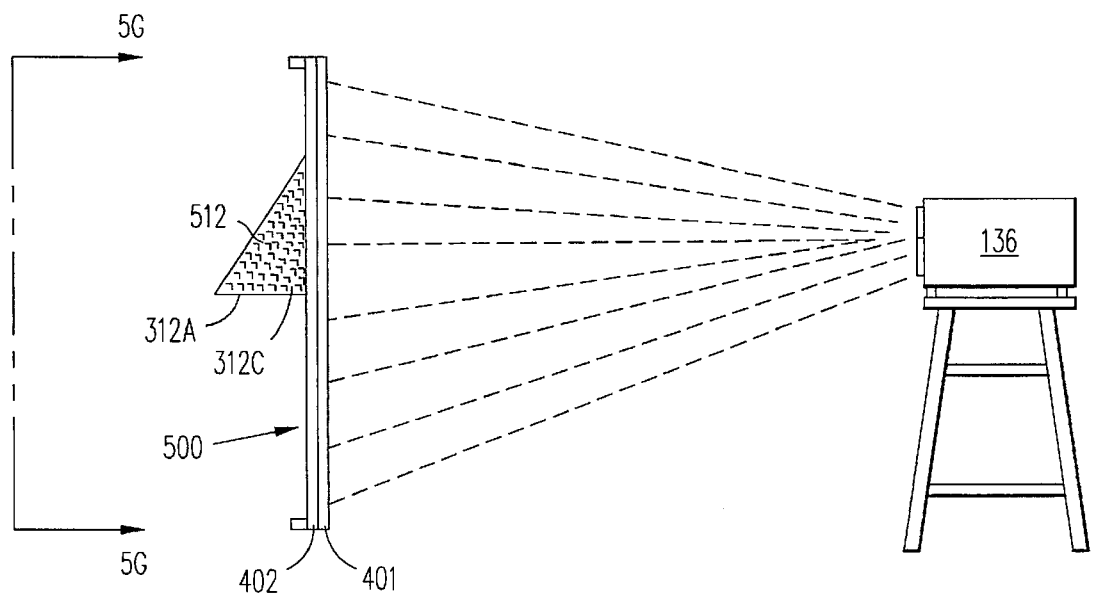
FIGS. 5F and 5G illustrate the blending of the details of the image replacement material in image loss areas with the details of the projected image in accordance with this invention.
Figure 5G:
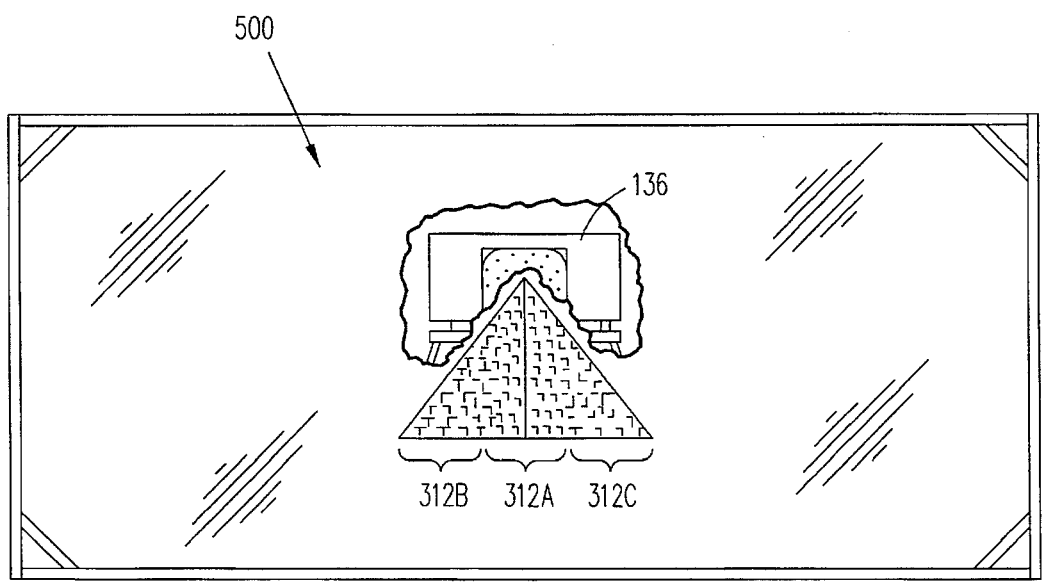
Figure 5H:
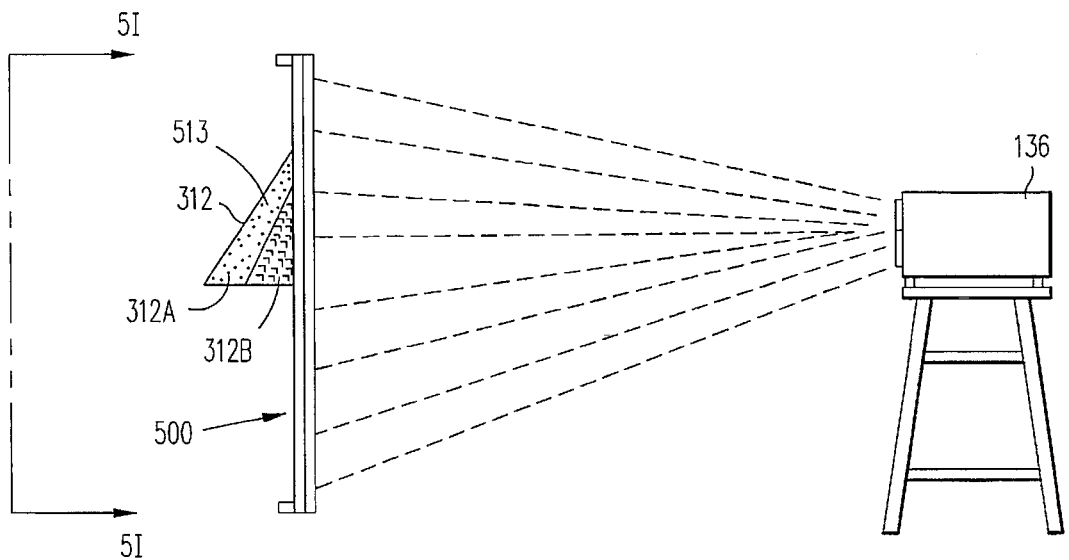
FIGS. 5H, 5I, 5J and 5K illustrate the application of two embodiments of image replacement material on a background screen in alternative embodiments of this invention.
Figure 5I:
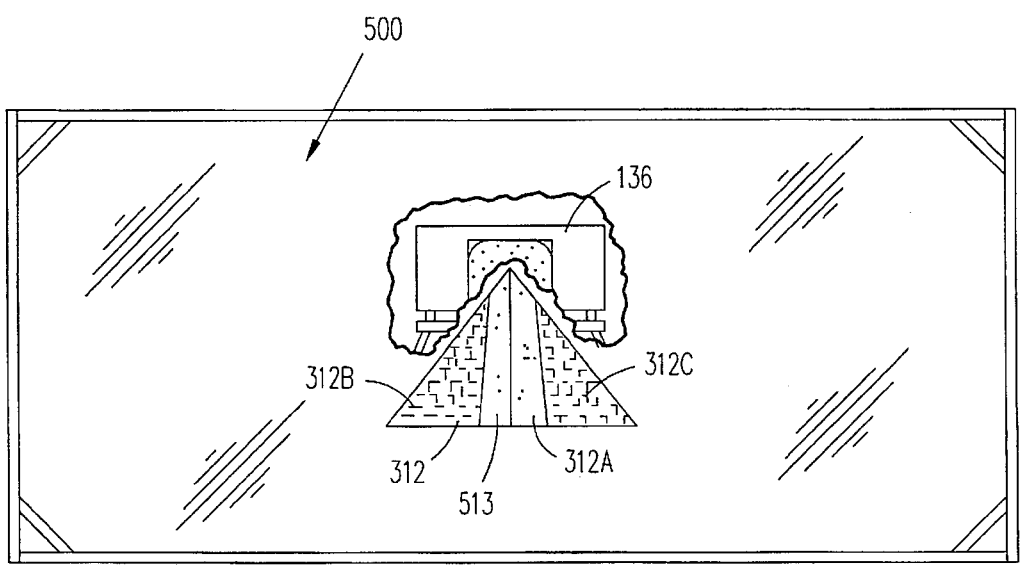
Figure 5J:
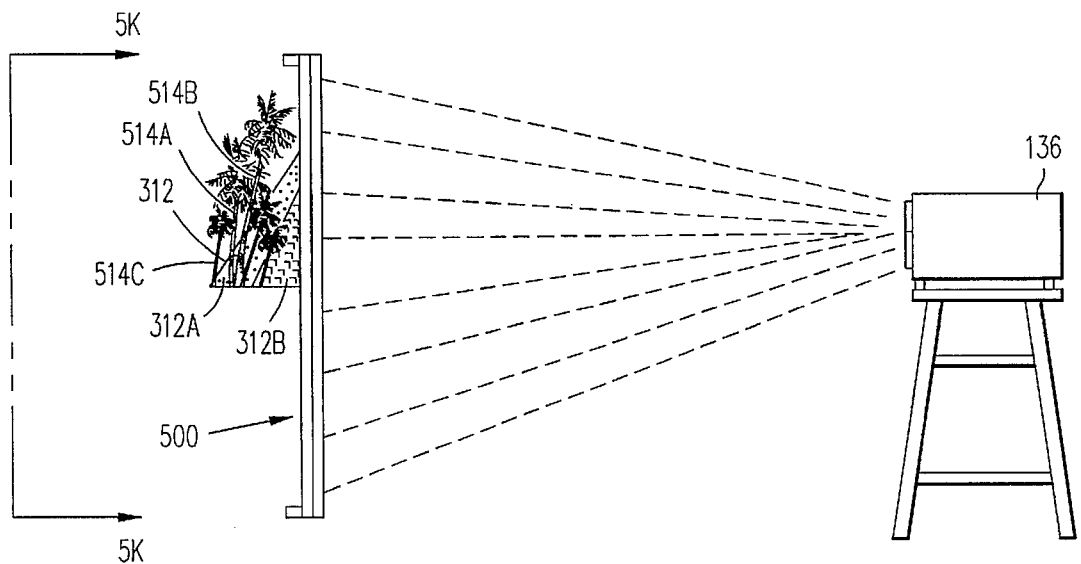
Figure 5K:
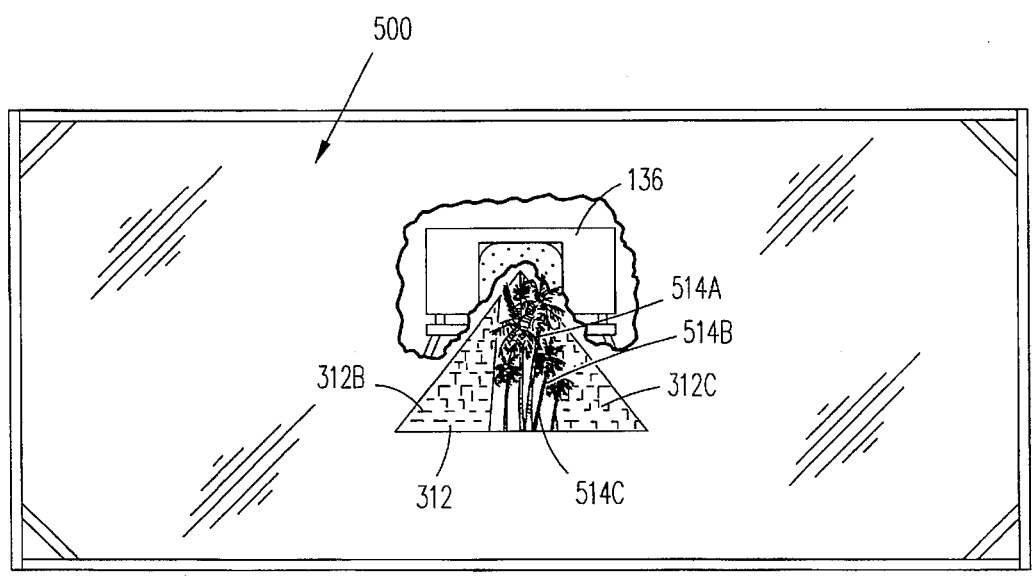

An image replacement material in accordance with this invention is any material which repairs loss of detail in a projected image for example by replicating the lost details locally and/or by masking the lost details by adding a new feature (such as a shadow in FIGS. 5H and 5I or the trees in FIGS. 5J and 5K). An image replacement material can be any material such as film products (for example DURA-CLEAR and DURATRANS) and traditional stage craft material (for example paint, paper, plastic, wood and canvas).

In FIG. 1B, area 152A contains a paint as image replacement material 152R to provide the details of a pyramid. The painted details on a background element supplement the details of a projected image to portray a complete image without loss of detail (as shown in FIGS. 5F and 5G).

The paint applied to image loss area 152A can be either transparent or opaque. In FIG 1B the paint in image loss area 152A is, Rotring transparent acrylic paint and Rotring opaque acrylic paints available from KOH-I-NOOR, 100 North Street, Bloosbury, N.J. 08804. Opaque paint has the advantage of richer texture. Transparent paint has the advantage of permitting a darker image to be projected through the painted details. For example, an image of a moving caravan of camels can be projected through transparent painted details of the pyramid's texture.

Other image replacement materials such as film products DURACLEAR™ and DURATRANS™ can also be used as replacement material 152R as described below in reference to FIGS. 5C, 5D and 5E.

In an alternative embodiment of this invention, instead of replicating the details of the lost image, a different complementary feature is added in an image loss area to mask lost details. A different complementary feature is any feature other than the projected image detail, such as a shadow. Hence in one embodiment, a shadow is painted with opaque paint in image loss area 152A to mask the lost surface texture detail of a projected image. Furthermore, a different complementary feature in accordance with this invention includes a three dimensional feature mounted adjacent to an image loss area. For example, a tree (similar to first and second background features 153A and 153B described below) can be mounted adjacent to image loss area 152A to mask the lost details (FIGS. 5J and 5K).

Background screen 130 also includes a second background element 153 which has the three dimensional shape of a landscape of sand. Second background element 153 is completely made of image replacement material such as film product and/or traditional stage craft materials. As shown in FIG. 1C, second background element 153 includes canvas 153D attached between frame members 151B, 151A and 151D and supported by a support net 153E. Support net 153E is a wire mesh which is supported by support struts (such as support struts 153F, 153G, 153H and 153I). Support struts 153F, 153G, 153H and 153I are in turn supported by frame members 151B, 151A, 151B, 151D, 151E and another frame member parallel to 151E (not shown). Canvas 153D is supported to have three dimensional contours to resemble a landscape of sand in the desert of Egypt.

Second background element 153 includes three dimensional background features such as first background feature 153A and second background feature 153B (both made from wire and fabric and painted to resemble trees). First background feature 153A is nearer to the audience and is larger than second background feature 153B to enhance the perception of depth.

Second background element 153 also includes two other background features such as sand dune feature 153C and path feature 153D which are formed by an artist applying paint to second background element 153D to resemble sand dunes and a path through sand dunes.

Background screen 130 also includes a third background element 154. Third background element 154 includes a central member 154A made of LEXAN™ coated with a projectionable material. Central member 154A is hemispherical in shape (radius r=3 inches and thickness t=¼ inch in FIG. 1C) and suspended with wires from frame 151 (FIGS. 6A, 6B, 6C and 6D). Third background element 154 also includes arms 154B, 154C, 154D, 154E, 154F, 154G, 154H and 154I made of gold painted plastic, which are attached to the periphery of central member 154A.

In accordance with this invention, projector 136 is used to project an image on background screen 130. The projected image has details for the surface texture of a pyramid corresponding to first background element 152 such that when front side 130F of background screen 130 (FIG. 1A) is viewed by a person in one of the seats in rows 111–118, a background illusion of a pyramid in Egypt is formed in the person's mind.

A background illusion of a fiery sun is created when a pulsating image of a lit fire is projected into a central member 154A of background element 154. The three dimensional shape of central member 154A creates a three dimensional illusion of a sun when the image is projected by projector 136.

Second background element 153 does not have a rear projected image, although a front projected image and smoke and other stage craft materials can be used to create an illusion of movement of sand in a desert storm.

The background illusion formed by background screen 130 depends upon the image projected by projector 136. For example, an illusion of a day background is formed by projecting an image with details and colors of the morning sky in display screen 155 so that third background element 154 appears as the rising sun. Alternatively, an illusion of a night background can be created by projecting an image with details and colors of a night sky (with twinkling stars) on display screen 155 so that third background element 154 appears as the full moon.

Furthermore, the projected image can contain details and features of a caravan of camels which can be shown moving along the horizon 156 on display screen 155. Therefore, background screen 130 can effectively portray to an audience a three dimensional background illusion of a scene in Egypt using appropriate rear projected images from projector 136. The projected images can be any images selected from appropriate backgrounds occurring in nature and captured on video/film/slide. Alternatively, the projected images can be scenes created by an artist in a high end graphics workstation to portray any scene determined to be a desirable background for a given show.

Although background screen 130 of FIGS. 1A, 1B, and 1C has been illustrated as including three background elements 152, 153 and 154, along with display screen 155, a background screen in accordance with this invention can be formed without a display screen or without a three dimensional background element containing a layer of a projectionable material.

In one embodiment a background screen includes a display screen such as display screen 155 and a second background element such as background element 153. Second background element 153 as noted above is completely made of image replacement materials which completely replace the details of the projected image. Therefore, the rear projected images are displayed only on display screen 155 and nowhere else.

Integration of video, slide and/or film projection technologies and conventional stage craft designs into a background screen with three dimensional background elements creates an illusion of a predetermined background which has depth, detail, color and shape of high quality. In a background screen, of this invention, a three dimensional background element provides depth without loss of detail and smoothly guides the viewer's eyes into the two dimensional display screen which displays additional details and elements formed by the projected image. A background screen in accordance with this invention can be easily stowed, transported, and stored over a short or long period of time, without significant degradation in the quality of the background illusion. Image storage is superior to traditional background scenery because the details of the background illusion are on video or film or slide which can be easily and safely stored transported and retrieved for later usage. Moreover, a background screen with a three dimensional background element can be installed and dismantled countless times with minor maintenance to the three dimensional background element.

Minor scratches on a background screen do not affect the quality of the background illusion because the image details are stored independently on video/film/slide. However, scratches in image loss areas such as 312A, can affect the background illusion. The quality of the background illusion can be assured in face of such scratches by applying image replacement material on a concave side of a background element which is not exposed and therefore not easily scratched. Alternatively, if replacement material has been applied on a convex side, degradation due to scratches can be eliminated by touching up the scratched areas with additional image replacement material, as described above in reference to image loss area 152.

A background screen in accordance with this invention allows projection of moving images (for example, caravan of camels) which are not possible in conventional background sceneries. Furthermore, the background screen is fairly lightweight (15 pounds in one embodiment) which can be quickly and easily moved into its position on a stage by stage hands. Weight of the background screen can be a key factor if a show requires rapid changes to the background scenery (between acts).

A background screen is superior to a conventional projection screen because instead of portraying all sceneries on a single generic projection screen, multiple customized background screens are used in accordance with this invention. Each background screen is uniquely customized with three dimensional background elements which provide depth without loss of detail and the background elements guide the viewers' eyes to the image projected on a two dimensional display screen. Therefore a three dimensional background illusion with realistic depth and detail is created, which is not possible with projection screens, unless the audience wears polarized glasses.

Furthermore, a background screen, is superior to a three dimensional projection screen, because an artist can use image replacement material to partially or even completely cover (for example by painting) a three dimensional background element, to portray realistic texture and depth, which are not adequately portrayed by a projected image.

A background screen can be fabricated as follows. A designer of a show first determines a certain background (henceforth, predetermined background) as being appropriate for the specific show. For example, a designer can determine that a background has two elements, a pyramid and a landscape of sand to effectively portray a scene from Lawrence of Arabia. Then the designer uses conventional video or film techniques to capture an image of the predetermined background from nature in a proper location (such as Egypt). The desired video or film image is then transferred into a commercially available high-end graphics design capable computer, such as Silicon Graphics Indigo 2 hardware and software system available from Silicon Graphics, 2011 N. Shoreline Blvd., Mountain View, Calif. 94043 and SoftImage Software from SoftImage, Inc. of 21, Rue De Tehran, Montreal, Canada. Alternatively a designer can create, within the computer, three-dimensional moving or still images of the predetermined background, which can be transferred to video or film for projecting images.

Certain selected elements in the desired image are then "dimensioned" to model a three-dimensional background element through any commercially available digitization process. The dimensions of the "sizes", "shapes", and "angles" of selected background elements are then extrapolated to suit the dimensions of a desired stage size background screen. The extrapolated dimensions can be used, in shaping, forming, injection, and cutting, of hard plastic and plastic foam, to create model elements which resemble the selected background elements. For example, background element dimensions can be used to craft a model element from foam using lathe cutting hardware Servo 3000 available from Servo, Inc., 433 N. Fairoaks Avenue, Pasadena, Calif. 91103. Alternatively, a foam model element can be crafted by hand.

Once a model element has been made, the model element can be used in creating a background element by a number of processes such as molding and vacuum forming. For vacuum forming, the model element is drilled with holes which draw the air between the model element and the sheet to be molded. Then the model element is attached to a flat panel also having numerous holes.

Figure 2A:
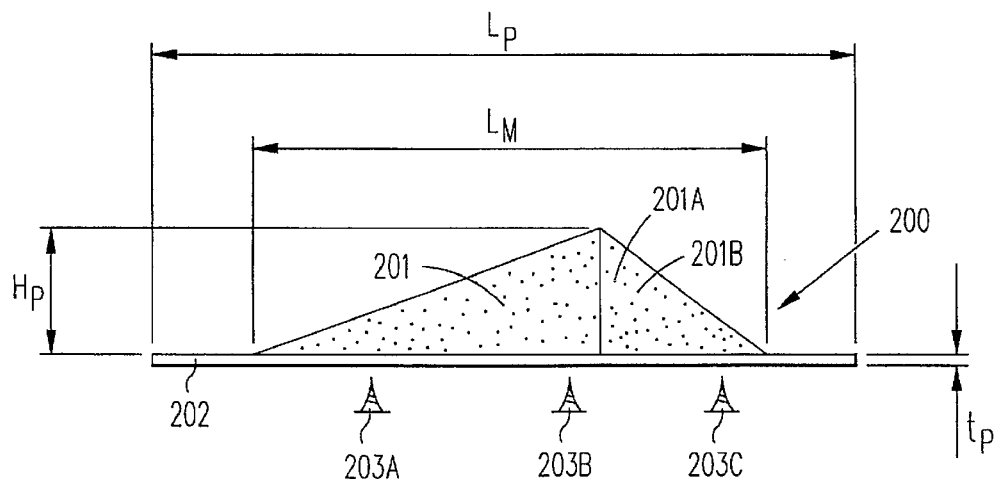
FIGS. 2A and 2B illustrate a model pyramid being attached to a panel in a method for fabricating a background screen in accordance with this invention.
Figure 2B:
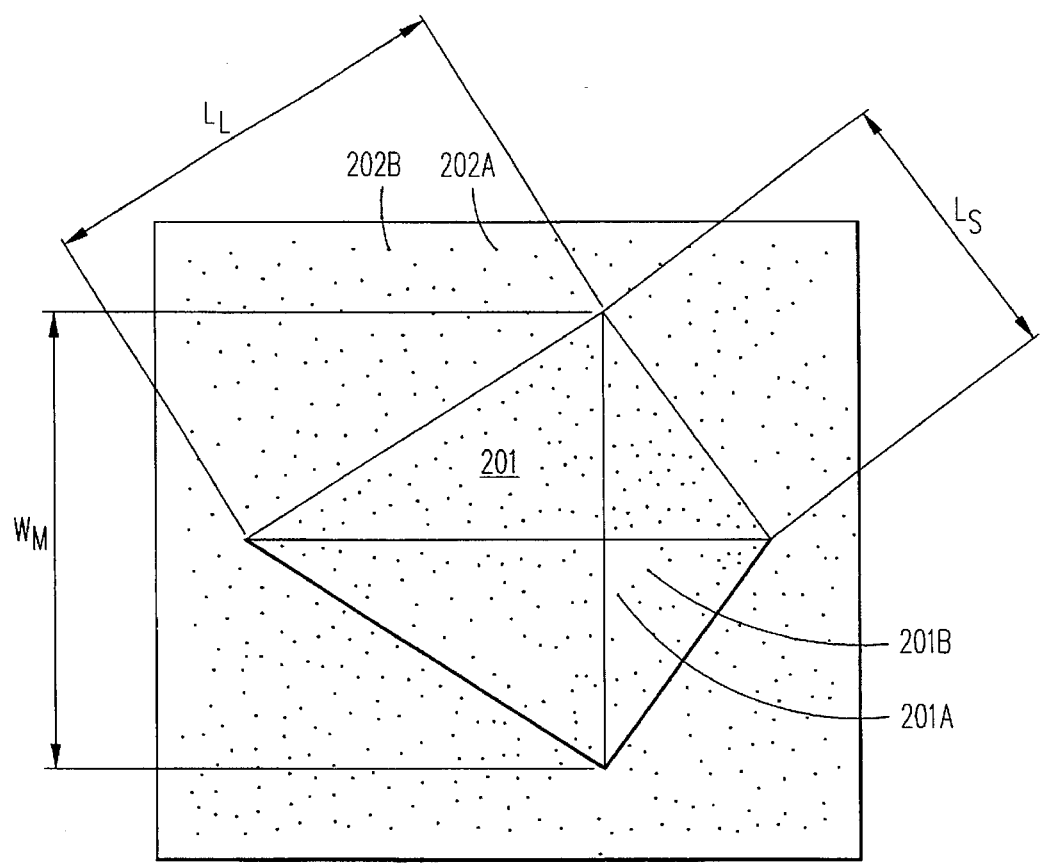

FIG. 2A illustrates a pyramid model element 201 having the shape of a pyramid, made of foam and having numerous holes such as holes 201A and 201B. Pyramid model element 201 is shown in FIG. 2A as being attached to panel 202 made of wood with screw 203A, 203B and 203C to form a panel and model element assembly 200. As shown in FIG. 2B, panel 202 also has numerous holes such as holes 202A and 202B. In the embodiment of FIGS. 2A and 2B, model element 201 has a length $L_M$=3.5 feet, a height $H_P$=6 inches, a width $W_M$=2.5 feet, a large side length $L_L$=2.5 feet and a small side length $L_S$=1.5 feet. Panel 202 has a width $W_P$=3 feet, a length $L_P$=4 feet, and thickness $t_P$=½ inch.

Figure 3A:
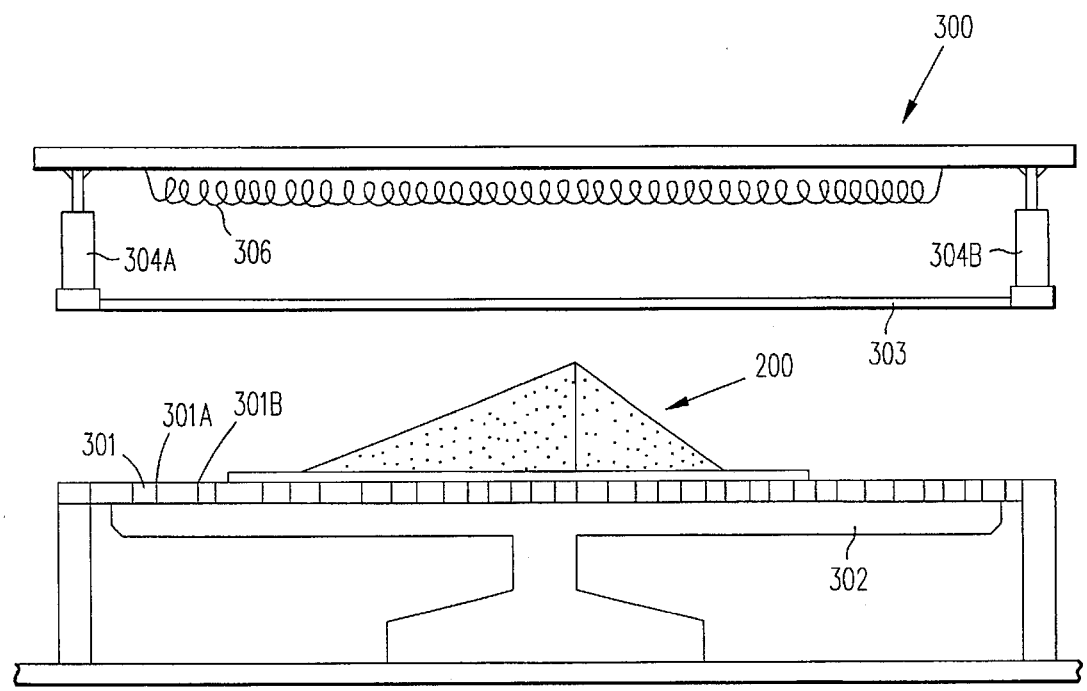
FIGS. 3A and 3B illustrate the use of a vacuum forming apparatus to form a molded sheet having a three dimensional shape of an element in a background screen.
Figure 3B:
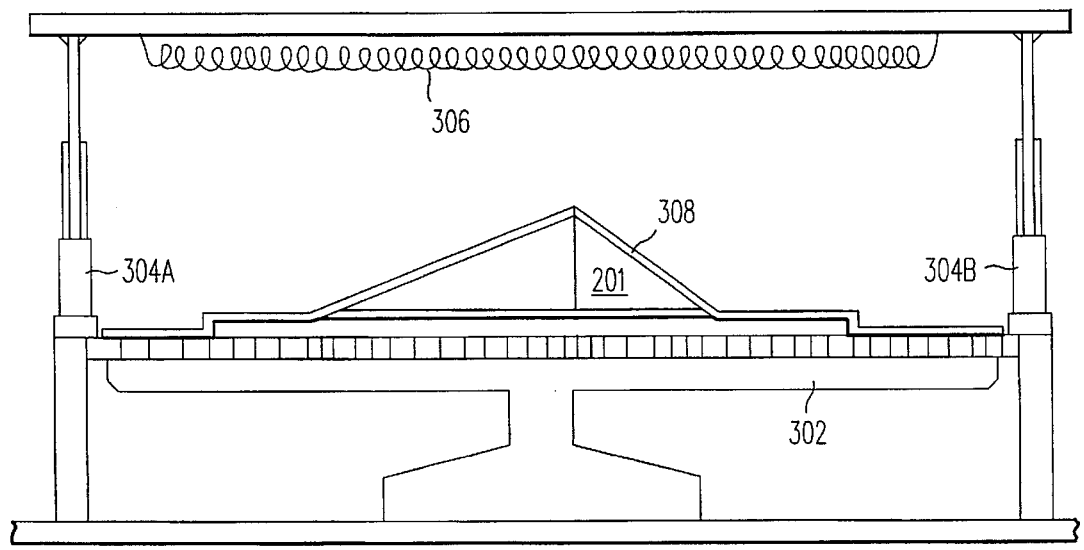

The panel and model element assembly 200 is then placed in a vacuum forming apparatus 300 as shown in FIG. 3A. Vacuum forming apparatus 300 includes a table 301 having numerous holes such as holes 301A and 301B. The holes of table 301 are connected to a vacuum pump 302. Vacuum forming apparatus 300 also includes arms 304A and 304B which hold a thermal forming sheet 303. Thermal forming sheet 303 can be any plastic sheet which softens when heated (such as LEXAN™) of 4 feet length, 3 feet width and ⅛ inch thickness (available from Tripp Plastics). Then, a heat coil 306 of vacuum forming apparatus 300 is used to heat thermal forming sheet 303. After heating to a suitable temperature (such as temperature 180° F.), the heated thermal forming sheet 303 is pushed on to panel and model element assembly 200 and vacuum is applied by vacuum pump 302 to form a molded sheet 308.

Figure 3C:
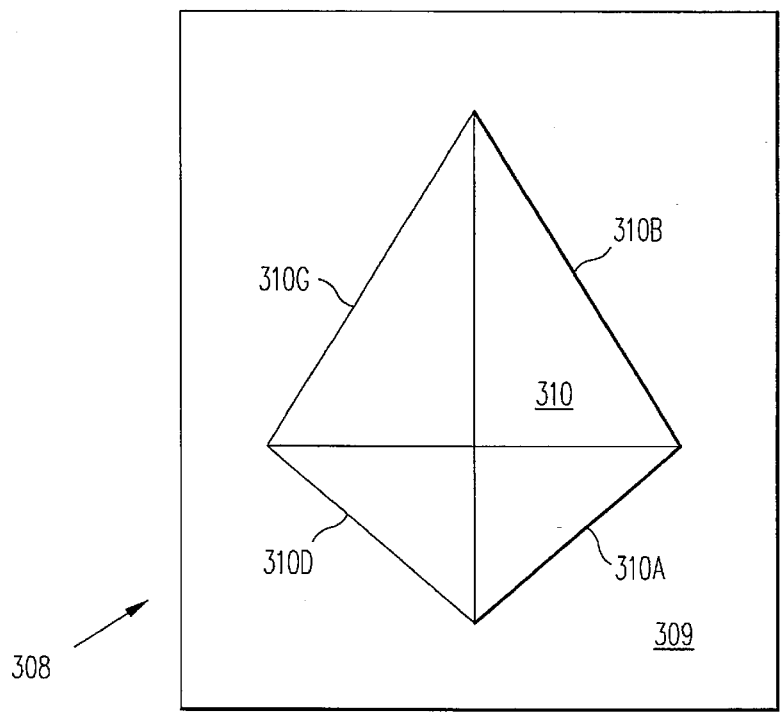
FIG. 3C illustrates the molded sheet formed by the vacuum forming apparatus of FIGS. 3A and 3B.

Then molded sheet 308 (FIG. 3C) is allowed to cool, inspected, repaired, and finished for imperfections. Then the molded sheet 308 is fastened securely to an area and edges 309 around the three dimensional pyramid shape are trimmed to form molded part 310. Molded part 310 has the same three dimensional shape as pyramid model element 201.

Figure 3D:
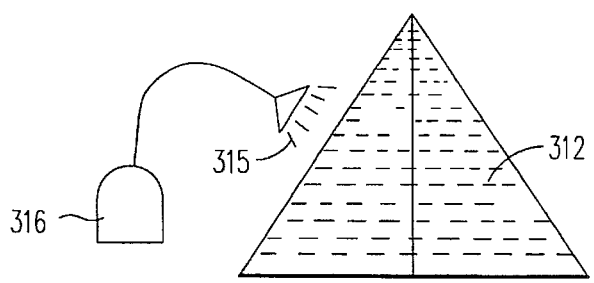
FIGS. 3D, 3E, 3F, 3G and 3H illustrate two methods of application of a projectionable material to a molded part to form a background element in accordance with this invention.
Figure 3E:
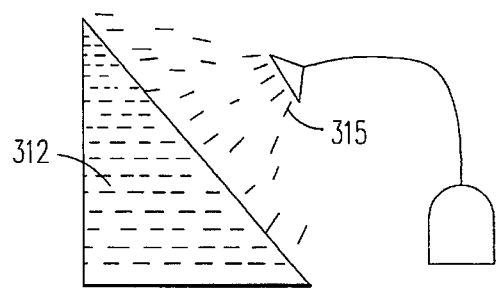

Then background element 312 is formed of molded part 310 and projectionable material 315 (for example as described in U.S. Pat. No. 3,637,285 and U.S. Pat. No. 4,478,902). In the embodiment of FIGS. 3D and 3E, a liquid projectionable material 315 is sprayed on molded part 310 by a sprayer 316. In alternative embodiments, liquid projectionable material 315 is applied to molded part 310 by hand brush, roller and airbrush.

Figure 3F:
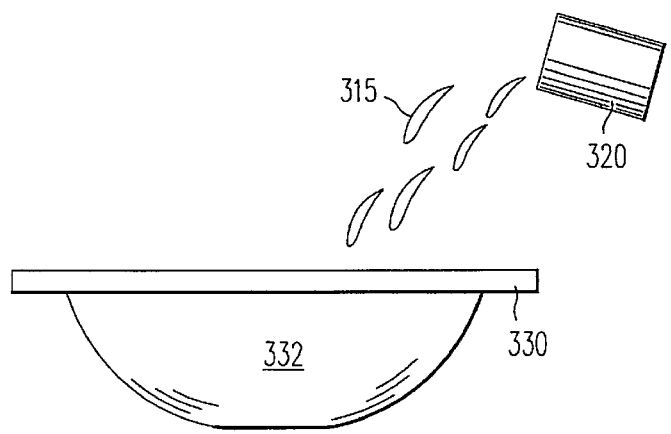
Figure 3G:
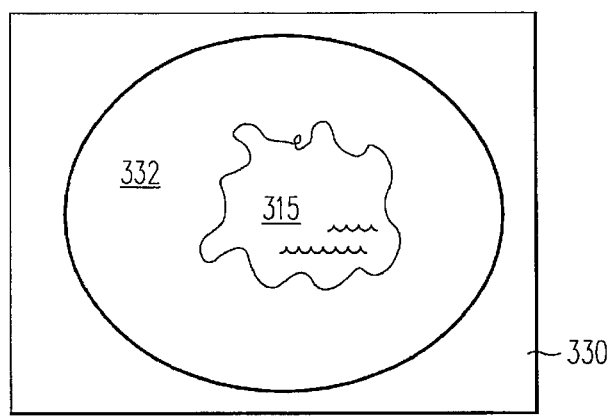
Figure 3H:
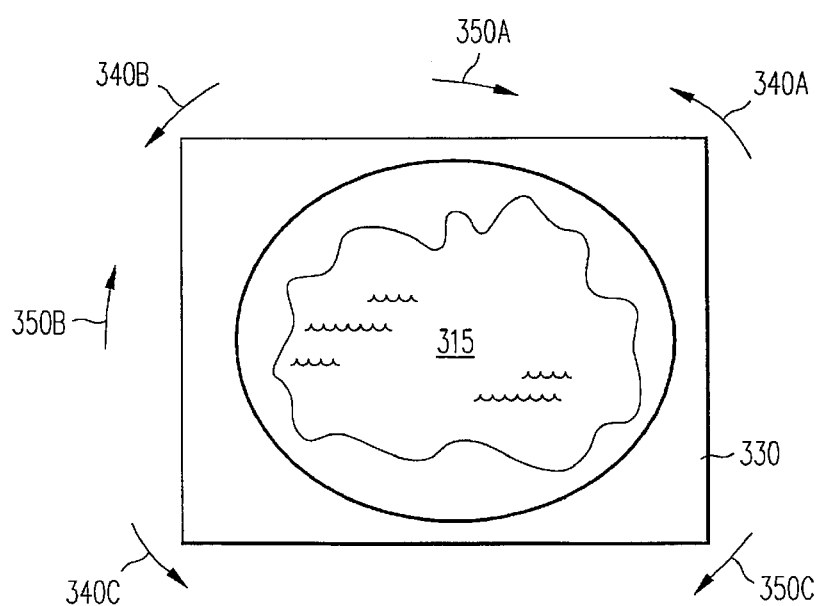

FIGS. 3F, 3G and 3H illustrate a method for coating a molded part 330 with a projectionable material to create a background element in accordance with this invention. In FIG. 3F, molded part 330 having a hemispherical surface 332 is used to form central member 154A of background element 154 (FIG. 1B). Projectionable material 315 is poured from a container 320 into the concave side of hemispherical surface 332 of molded part 330. As shown in FIG. 3G, a small amount as necessary (such as an ounce) of projectionable material 315 is poured into hemispherical surface 332. Then as shown in FIG. 3H the molded part is rotated in clockwise direction shown by arrows 350A, 350B and 350C and also in anticlockwise direction 340A, 340B and 340C alternatively, in order to form a uniform coating of projectionable material 315 on hemispherical surface 332. As projectionable material 315 dries, the coating on hemispherical surface 332 becomes opaque (from an initially clear projectionable material 315). After projectionable material 315 in hemispherical surface 332 has formed an opaque uniform coating, any excess liquid projectionable material 315 is spun out of molded part 330.

Figure 4A:
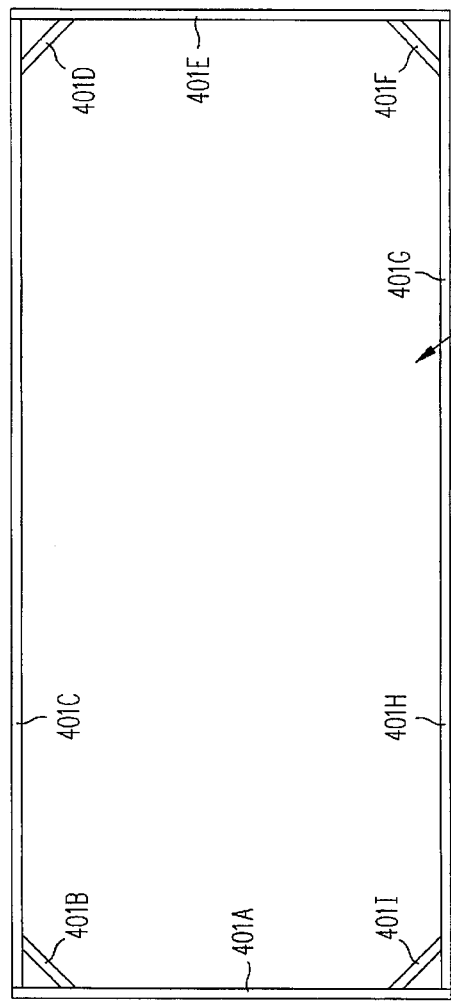
FIGS. 4A and 4B illustrate a frame for supporting a background element in accordance with this invention.
Figure 4B:
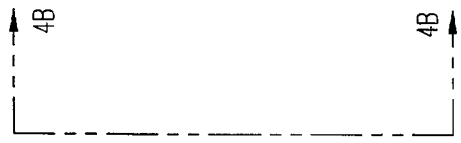
Figure 4C:
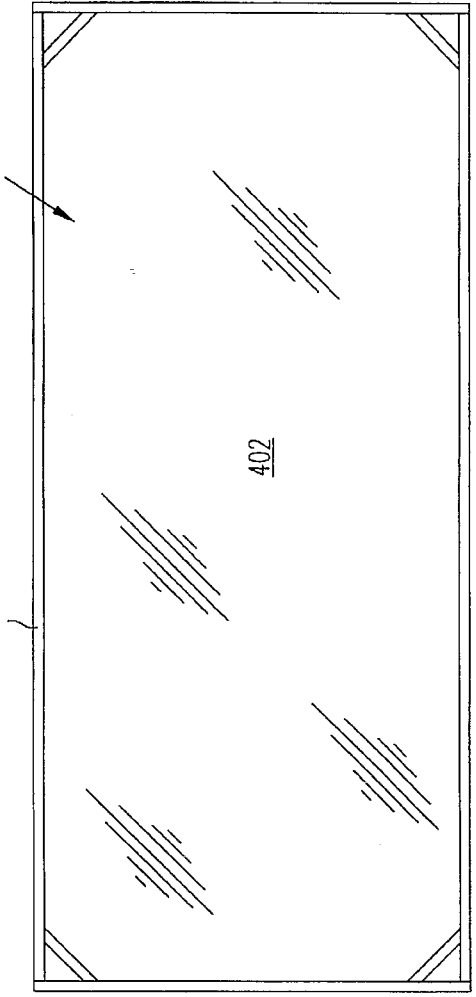
FIGS. 4C and 4D illustrate a display screen mounted on a frame of a background screen.

In addition to background element 312, a background screen 400 includes a frame 401 (FIGS. 4A and 4B). Frame 401 is formed from wood or metal of frame members 401A, 401B, 401C, 401D, 401E, 401F, 401G, 401H and 401I joined together (FIGS. 4A and 4B).

Figure 4D:
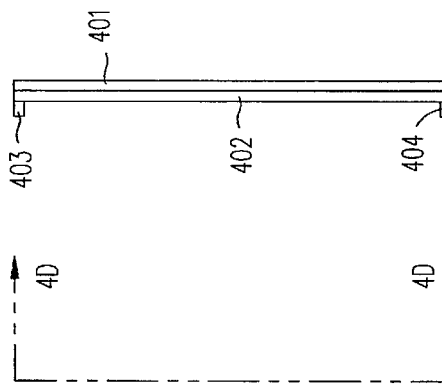

In the embodiment of FIGS. 1A, 1B and 1C, the background screen also includes a display screen made by spraying projectionable material on a ⅛ inch flat, rigid sheet of clear LEXAN™. The projectionable material is not applied in areas covered by a background element. Display screen 402 (FIGS. 4C and 4D) is mounted on frame 401 using mounting members 403 and 404. In one embodiment, mounting members 403 and 404 are wood pieces attached to frame 401 by screws (not shown).

Figure 4F:
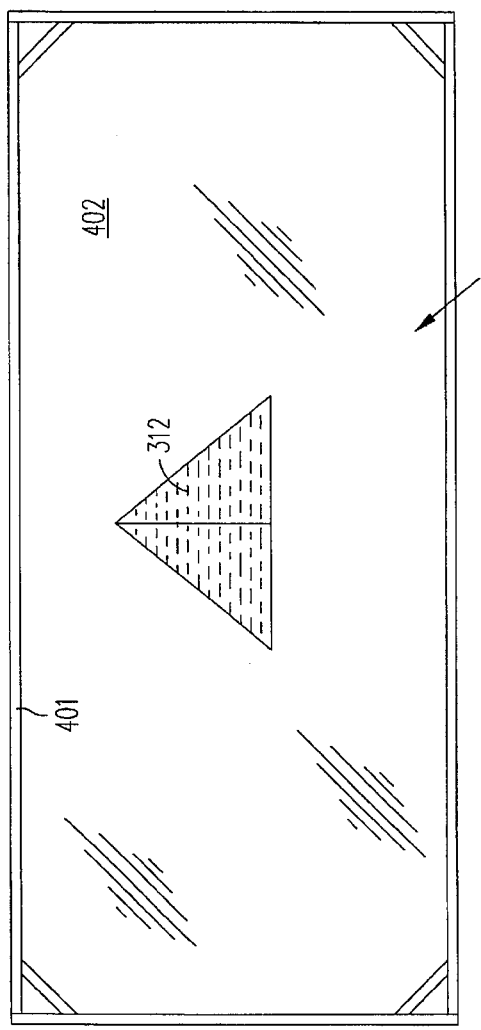
FIGS. 4E and 4F illustrate a background element mounted on the display screen of FIGS. 4C and 4D.
Figure 4E:
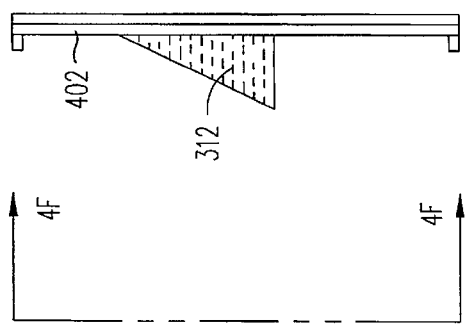

Then, background element 312 is supported by frame 401 (FIGS. 4E and 4F). In the embodiment of FIGS. 4E and 4F background element 312 is mounted on display screen 402 using an adhesive such as CYLOK®P (above).

Then, an image on slide or film or video of the predetermined background is projected onto the background screen 312 (FIG. 5A). Background screen 312 has loss of image detail in areas such as area 312A. In other areas, such as areas 312B and 312C (FIG. 5B), there is no image loss or minimal image loss, which is image loss not perceptible from a seat in audience area 102 (FIG. 1A). Projector 136 is shown in a cut-away-view through background screen 312 in FIG. 5B. Areas of imperfect convergence and/or focus such as areas 312A are noted and an artist applies image replacement material to area 312A of background element 312.

In the embodiment of FIG. 5C, the image replacement material is a film product. A film containing the image details for background element 312 is then sent to Kodak of Rochester, N.Y. for transferring the image details onto the film product such as DURATRANS™ or DURACLEAR™. In the embodiment of FIG. 5C, Kodak transfers the image details onto a replacement sheet 510 of DURATRANS™ of length L=2 feet and width W=1 foot.

Depending on the application involved, a background element can have different amounts of projectionable material which results in different amounts of translucence. In one embodiment of this invention, a background element has a small amount of projectionable material which allows a large percentage of incident light (greater than 50%) to pass through the background element, in which case DURATRANS™ is used as the image replacement material. In another embodiment of this invention, a background element has a large amount of projectionable material so that a small percentage of incident light (less than 50%) passes through the background element, in which case DURACLEAR™ is used.

Replacement sheet 510 has image details for the texture of a pyramid as shown in FIG. 5C. A replacement material 512 corresponding to the area of image loss 312A is then marked on replacement sheet 510. Then the surrounding portion 513 is trimmed to obtain replacement material 512. Replacement material 512 is then glued with an adhesive such as CYLOK®P (above) to pyramid 312 at the corners of image loss area 312A (FIG. 5E). Although in FIG. 5E, replacement material 512 is shown being applied to a convex side of background element 312, in an alternative embodiment of this invention, replacement material 512 is applied to the concave side of background element 312.

Once a replacement material has been applied, a background screen 500 accurately portrays a background illusion of a pyramid when a projector 136 projects an image because the projected image details in area 312C blend with the details of replacement material 512 in image loss area 312A (as shown in FIGS. 5F and 5G).

Third background element 154 of background screen 130 can be fabricated in a manner similar to that described above. Second background element 153 of background screen 130 is fabricated using traditional stage craft fabrication methods well known in the art.

FIGS. 5H and 5I illustrate the use of image replacement material in the form of a shadow to mask the details of the projected image in image loss area 312A. A shadow 513 is painted by an artist to resemble a shadow cast by a cloud or by a plane in alternative embodiments. In the embodiments of FIGS. 5H and 5I an opaque gray paint is used as the image replacement material.

FIGS. 5J and 5K illustrate the use of image replacement material (such as a wire and cloth) to form three dimensional trees such as trees 514A, 514B and 514C to mask the view of image loss area 312A of pyramid 312 from a seat in audience area 102.

Figure 6A:
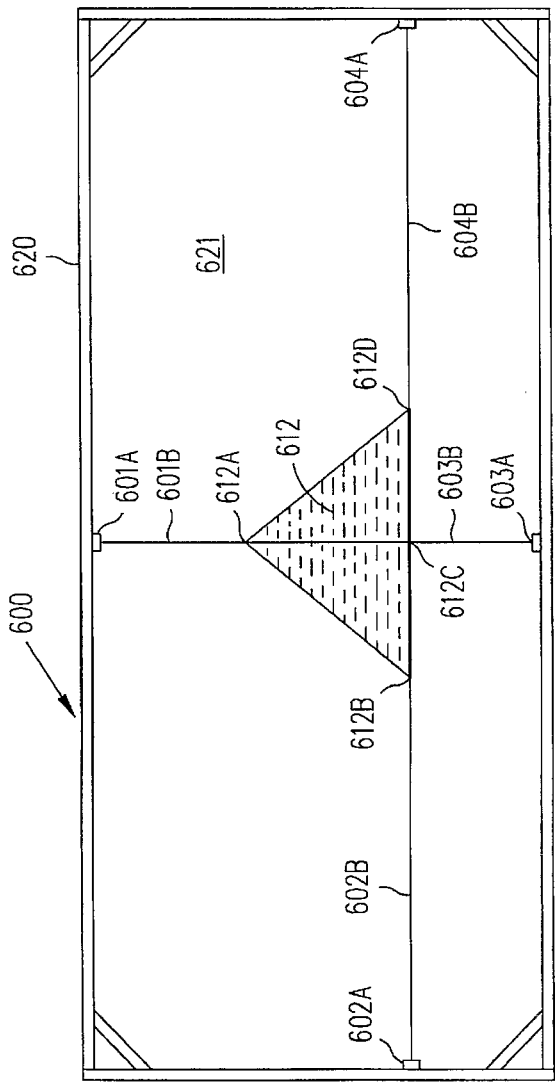
FIGS. 6A and 6B illustrate suspension of a background element from a frame using wires in accordance with this invention.
Figure 6B:
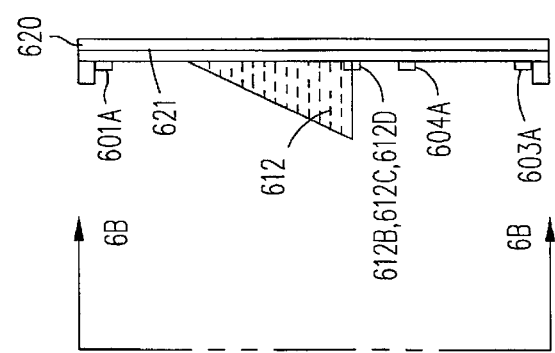

FIGS. 6A and 6B illustrate an alternative method for mounting a background element 612 on a frame 620. Background screen 600 includes mounting elements 601A, 602A, 603A and 604A and corresponding wire elements 601B, 602B, 603B and 604B which are used to suspend background element 612 from frame 620. Wire elements 601B, 602B, 603B and 604B can be cut from any wire such as an 8 lb test STREN™ fishing line of Dupont Chemical available from any sporting goods store such as K-MART. Any other wire which is thin enough to be invisible from a seat in audience area 102 can be used to form the wire elements. Wire elements 601B, 602B, 603B and 604B are tied to background element 612 at points 612A, 612B, 612C and 612D respectively through holes in background element 612.

Figure 6C:
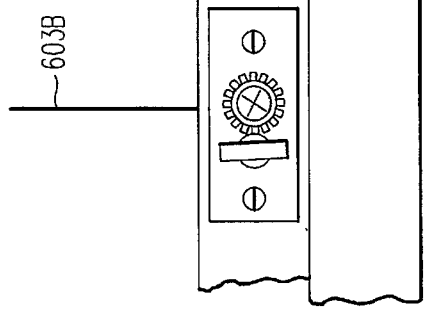
FIGS. 6C and 6D illustrate a mounting device used to tighten the wires in FIGS. 6A and 6B.
Figure 6D:
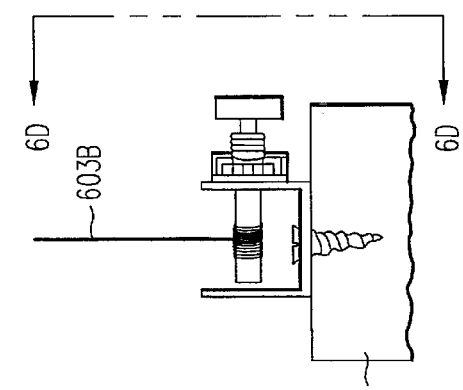

Wire elements 601B, 602B, 603B and 604B are tightened using mounting element 601A, 602A, 603A and 604A which are attached to frame 620 using a screw. In one embodiment, the mounting element is a ratchet mechanism of the type used in a guitar to tighten guitar strings as shown in FIGS. 6C and 6D.

Background screen 600 has the advantage of allowing a background element 612 to be quickly and easily mounted or dismounted from the background screen which can be valuable in changing the scenery between acts of a performance. Also, as noted above, a diaphanous, flexible display screen can be used in background screen 600 (instead of a rigid display screen for example LEXAN™) to create a light weight background screen 600.

Figure 7A:
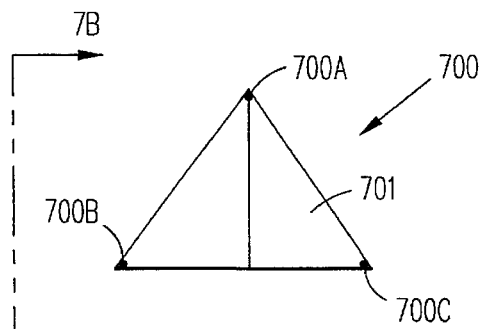
FIGS. 7A and 7B illustrate another embodiment of a background element having a number of pegs.
Figure 7B:
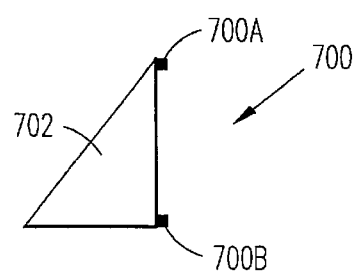
Figure 7C:
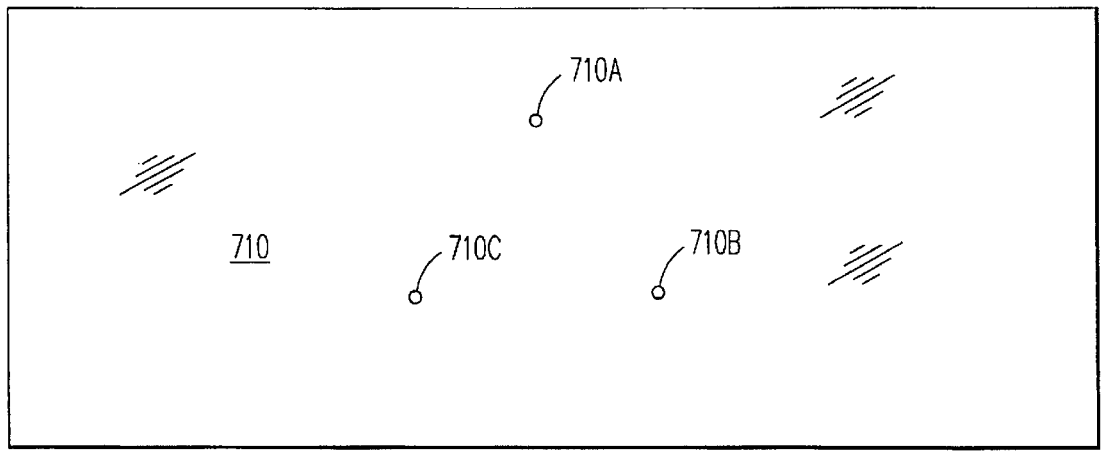
FIG. 7C illustrates a display screen having holes corresponding to the pegs of the background element of FIGS. 7A and 7B.

FIGS. 7A and 7B illustrate a background element 700 having three pegs 700A, 700B and 700C. Pegs 700A, 700B and 700C are ¼ inch long, ¼ inch diameter pegs cut from a commercially available acrylic rod and attached using epoxy to the concave side 701 of background element 700 at its three corners as shown in FIG. 7A.

Figure 7D:
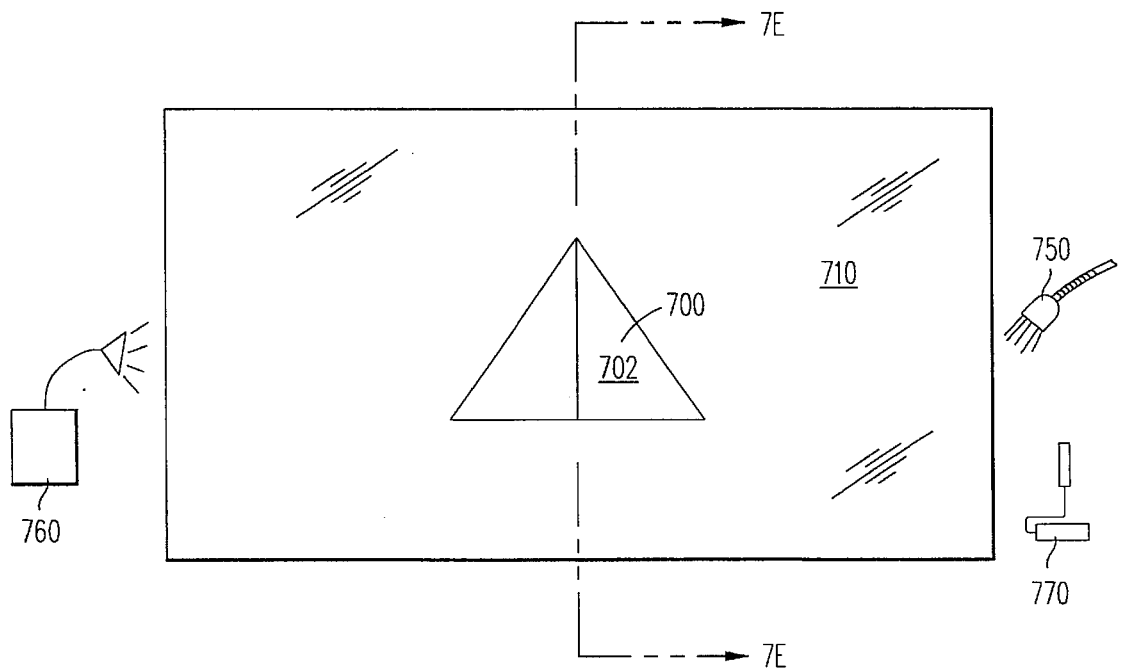
FIG. 7D illustrate the background element of FIGS. 7A and 7B removably mounted in the display screen of FIG. 7C.
Figure 7E:
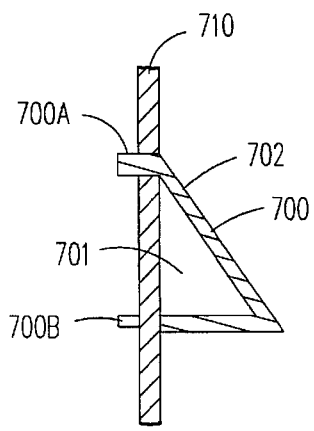
FIG. 7E is a cross-sectional view in the direction 7E—7E of FIG. 7D.

FIG. 7C shows a display screen 710 which has three holes 710A, 710B, and 710C. Display screen 710 has a layer of projectionable material in all areas except for the triangular area between holes 710A, 710B and 710C which is covered background element 700. In one embodiment, the projectionable material is applied before background element 700 is mounted on display screen 710. Holes 710A, 710B and 710C are ¼th inch holes drilled in display screen 710 to allow background element 700 to be removably mounted on display screen 710 as shown in FIG. 7D. Each of pegs 700A, 700B and 700C of background element 700 is inserted into a corresponding holes 710A, 710B and 710C of display screen 710 to removable mount background element 700 on display screen 710. FIG. 7E illustrates a cross sectional view along the direction 7E—7E of FIG. 7D. Removable mounting of a background element provides considerable flexibility to change the background elements of a background screen quickly and also allows easier packing and transportation of a background screen.

In one embodiment of this invention, projectionable material is applied to display screen 710 and background element 700 together after background element 700 is mounted on display screen 710. The projectionable material can be applied using a hand brush 750, a roller 770 or an air brush 760 as shown in FIG. 7D. Such application does not require the extra work of marking the areas covered by a background element for application of projectionable material on a display screen (FIG. 7C).

Figure 8A:
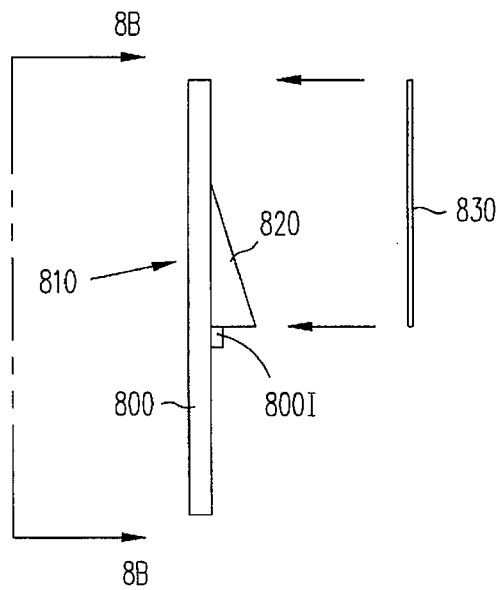
FIGS. 8A and 8B illustrate an alternative embodiment of a background screen having a diaphanous display screen.
Figure 8B:
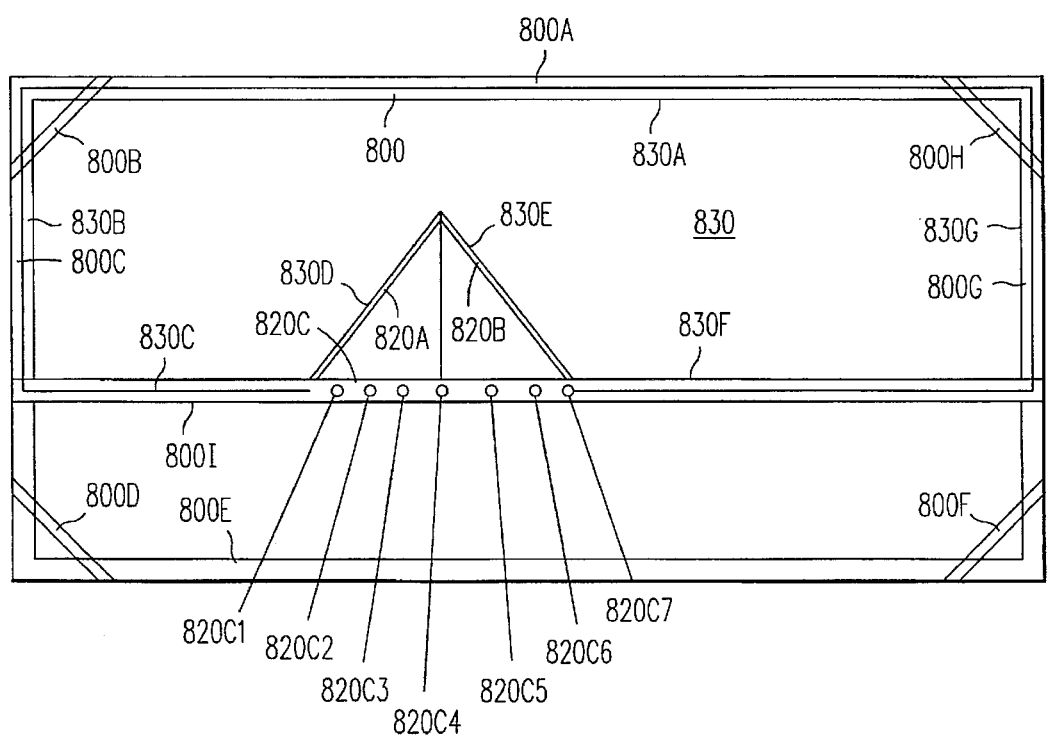

FIGS. 8A and 8B illustrate an alternative embodiment of a background screen 810. Background screen 810 includes a frame 800 having sides 800A, 800B, 800C, 800D, 800E, 800F, 800G and 800H as described above in reference to FIGS. 4A and 4B. However, frame 800 includes an additional frame member 800I which connects member 800C to member 800G at the location of a horizon such as horizon 156 of FIG. 1B. Frame member 800I is provided with holes to receive pegs 820C1, 820C2, 820C3, 820C4, 820C5, 820C6 and 820C7 of pyramid 820. Once background element 820 has been mounted on frame 800, display screen 830 is mounted next.

Display screen 830 of FIGS. 8A and 8B is a thin diaphanous sheet which is cut from the Stewart Film Screen 180 described above to fit in the space enclosed by frame 800 and background element 820 above horizon 156. The diaphanous sheet is cut in the area covered by background element 820 to allow the projected image to be incident on background element 820. Then an adhesive (such as an epoxy or an adhesive tape) is used to attach each side of the display screen 830 to frame 800. For example, one can attach display screen side 830A to frame member 800A, display screen side 830B to frame member 800C, display screen side 830C to frame member 800I, display screen side 830D to side 820A of background element 800, display screen side 830E to side 820B of background element 820, display screen side 830F to frame member 800I, and display screen side 830G to frame member 800G respectively.

FIG. 9A illustrates a background screen 900 having a frame 910 which supports a display screen 901. Mounted on display screen 901 is a background element 902. Background element 902 is completely covered with replacement material 903 as shown by arrow 904 and by replacement material 904 as shown by arrow 905. Background screen 900 has the advantage that a projector need not project the texture details of the pyramid. Therefore, any image such as the image of Grand Canyon can be projected on display screen 901 so as to create an illusion of a pyramid in the middle of Grand Canyon.

FIGS. 9B and 9C illustrate another embodiment of a background screen 920 in accordance with this invention. Background screen 920 includes a frame 921 on which is mounted a display screen 922. Mounted on display screen 922 is a background element 923 having paint 924 to provide the surface texture details in image loss area 923A. Paint 924 is applied by an artist using a brush 925 and/or air brush 926 to skillfully blend the texture details in image loss area 923A with the projected image details in areas 923B and 923C.

Figures 10A, 10B:
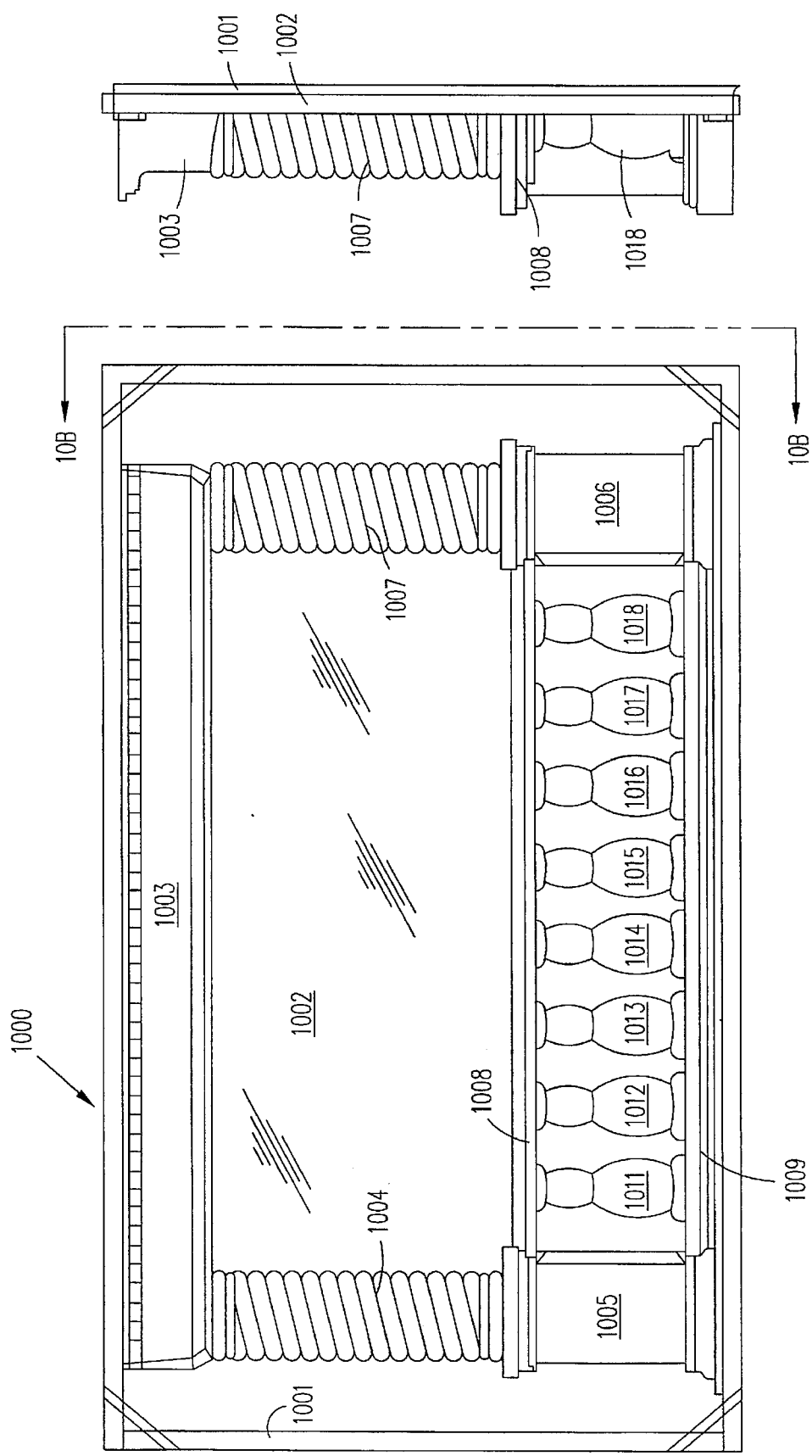
FIGS. 10A and 10B illustrate an alternative embodiment of a background screen in accordance with this invention.

FIGS. 10A and 10B illustrate another embodiment of a background screen 1000 for forming an illusion of a view from a balcony. Background screen 1000 includes a frame 1001 and a display screen 1002 mounted on frame 1001. Mounted on display screen 1002 are background elements 1003, 1004, 1005, 1006, 1007, 1008, 1009, 1011, 1012, 1013, 1014, 1015, 1016, 1017, and 1018. In one embodiment of this invention, background elements 1003, 1004, 1005, 1006, 1007, 1008, 1009, 1011, 1012, 1013, 1014, 1015, 1016, 1017, and 1018 are formed by vacuum forming and coated with a projectionable material (described above) so that the details and texture for the background elements are projected by an image.

As described above, image replacement material is used to replicate the image detail in any image loss areas. In an alternative embodiment of this invention, image replacement material is located on all areas of each of background elements 1003, 1004, 1005, 1006, 1007, 1008, 1009, 1011, 1012, 1013, 1014, 1015, 1016, 1017 and 1018 as described above, so that all the details of a balcony are present locally on background screen 1000. In one embodiment, a film product such as DURATRANS™ is applied on the concave side of each background element before the background element is mounted on display screen 1002. Therefore the image replacement material is sealed in the enclosure between a background element concave side and the display screen thereby protecting the image replacement material from degradation during transportation or other wear and tear. As the background element details are present locally on background screen 1000, the image projected on display screen 1002 can contain details and elements completely unrelated to a balcony (such as a view of the Grand Canyon).

FIG. 11A illustrates a mold having a three dimensional shape in accordance with this invention. Molded part 1100 is formed by any traditional mold making process (such as vacuum forming or thermal forming). Molded part 1100 has a three dimensional shape contoured to reflect the shape of elements in a background illusion to be formed by a background screen.

As shown in FIG. 11B, molded part 1100 is attached to the ceiling of a room 1102 and a chemical spray mechanism 1101 is used to spray a projectionable material on molded part 1100. The projectionable material is repeatedly sprayed by chemical spray mechanism 1101 at calculated intervals until a desired thickness of the projectionable material has been sprayed on molded part 1100. Then the projectionable material is allowed to dry and cure. On drying, the projectionable material forms a thin diaphanous sheet having a three dimensional shape of molded part 1100. The diaphanous sheet formed by the projectionable material is then peeled away from molded part 1100. Diaphanous sheet 1103 is then mounted vertically on a frame such as frame 400 of FIG. 4A to form a background screen. Then images are projected on the background screen (FIGS. 5A and 5B). Image loss areas on diaphanous sheet 1103 are then corrected by applying image replacement material (FIGS. 5C, 5D, 5E, 5F and 5G).

In one embodiment, stage screen conveyance enabling devices are bonded at pre-determined locations to the frame (such as frame 151 of FIGS. 1B and 1C) of a background screen to allow the background screen to travel freely through a stage screen conveyance mechanism. Alternatively, fixed and caster wheels and brakes can be attached to the frame of a background screen to allow stage hands to manually move a background screen into location easily and quickly.

Although the present invention has been described in connection with the above described illustrative embodiments, the present invention is not limited thereto. For example, instead of a theater, any other performance hall or even open grounds can be used in accordance with this invention. Moreover, instead of a frame having square or rectangular shapes, a frame can have other shapes such as a triangle, a circle and an ellipse. Moreover, instead of a display screen containing projectionable material for rear projection, a display screen in accordance with this invention can be opaque and have white paint suitable for front projection of images. Furthermore, instead of a single display screen, a background screen can have multiple display screens arranged in the same plane or parallel to each other or at angles to each other in accordance with this invention. Also, although the images projected on a background screen are described above as being stored on video, film or slide, any other storage media, such as a compact disk (CD) can be used in accordance with this invention. Various modifications and adaptations of the above discussed embodiments are encompassed by this invention as set forth in the appended claims.

What is claimed is:

1. A background screen for forming an illusion, said background screen comprising:

means for displaying a projected image, said means for displaying having a three-dimensional shape, said means for displaying having an area substantially incapable of displaying a portion of said projected image; and means for correcting said portion of said projected image on said area, said means for correcting being located on said area of said means for displaying.

2. The background screen of claim 1 wherein said portion comprises detail, and said means for correcting comprises paint representing said detail.

3. The background screen of claim 2 wherein said paint is opaque.

4. The background screen of claim 2 wherein said paint is transparent.

5. The background screen of claim 1 further comprising second means for displaying a projected image, said second means for displaying having a two-dimensional shape.

6. The background screen of claim 5 wherein said second means for displaying has another area substantially incapable of displaying another portion of said projected image, said background screen further comprising second means for correcting said another portion of said projected image, said second means being located on said another area of said second means for displaying.

7. The background screen of claim 5 further comprising a frame, said means for displaying and said second means for displaying being supported by said frame.

8. The background screen of claim 7 further comprising a wire, said wire suspending said means for displaying from said frame.

9. The background screen of claim 5 wherein said second means for displaying comprises projectionable material.

10. The background screen of claim 5 wherein said second means for displaying comprises an opaque material.

11. The background screen of claim 5 wherein said means for displaying is mounted on said second means for displaying.

12. The background screen of claim 1 wherein said means for displaying comprises an opaque material.

13. The background screen of claim 1 wherein said projected image has details and said means for correcting corrects for loss of said details.

14. The background screen of claim 1 wherein said projected image has detail and said means for correcting comprises a feature other than said detail.

15. The background screen of claim 14 wherein said feature comprises a shadow.

16. The background screen of claim 1 wherein said means for correcting comprises a film product.

17. The background screen of claim 16 wherein said film product is DURACLEAR™.

18. The background screen of claim 16 wherein said film product is DURATRANS™.

19. The background screen of claim 1 wherein said means for correcting is located on all areas of said means for displaying.

\* \* \* \* \*